United States Patent
Tsusaka et al.

(10) Patent No.: US 10,245,733 B2
(45) Date of Patent: Apr. 2, 2019

(54) ROBOT, METHOD FOR CONTROLLING ROBOT, AND RECORDING MEDIUM

(71) Applicant: Panasonic Intellectual Property Management Co., Ltd., Osaka (JP)

(72) Inventors: Yuko Tsusaka, Osaka (JP); Yudai Fudaba, Osaka (JP); Yasunao Okazaki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 15/347,882

(22) Filed: Nov. 10, 2016

(65) Prior Publication Data
US 2017/0157773 A1    Jun. 8, 2017

(30) Foreign Application Priority Data

Dec. 2, 2015   (JP) ................................ 2015-236130

(51) Int. Cl.
*B25J 11/00* (2006.01)
*A61G 7/10* (2006.01)
(Continued)

(52) U.S. Cl.
CPC .......... *B25J 11/009* (2013.01); *A61G 7/1017* (2013.01); *A61G 7/1046* (2013.01); *A61H 3/04* (2013.01);
(Continued)

(58) Field of Classification Search
CPC ........ B25J 11/009; B25J 5/007; B25J 9/1669; B25J 9/1679; B25J 19/0004; B25J 9/1674;
(Continued)

(56) References Cited

U.S. PATENT DOCUMENTS 5,524,303 A * 6/1996 Palmer, Jr. ........... A61G 7/1015
5/507.1
2003/0187524 A1   10/2003   Hashimoto et al.
(Continued)

FOREIGN PATENT DOCUMENTS

JP    62-164112    7/1987
JP    2000-137514    5/2000
(Continued)

*Primary Examiner* — Bao Long T Nguyen
(74) *Attorney, Agent, or Firm* — Wenderoth, Lind & Ponack, L.L.P.

(57) ABSTRACT

A robot includes a tractor, a walker, an input device, and a controller. The tractor includes a connector and pulls a user through the connector. The walker includes wheels for moving the tractor and one or more brakes for the wheels and is coupled to the tractor. The input device receives an instruction to operate at least one of the tractor and the walker. In response to reception of the instruction by the input device, the controller determines whether or not to permit the tractor and/or the walker to perform a process based on the instruction, in accordance with a current state of the robot, the current state being one of a plurality of states of the robot. Each state is represented by using values of items, one of the items being an item indicating whether or not the one or more brakes are applied to the wheels.

8 Claims, 20 Drawing Sheets

(51) Int. Cl.
*B25J 9/16* (2006.01)
*B25J 5/00* (2006.01)
*A61H 3/04* (2006.01)

(52) U.S. Cl.
CPC .............. *B25J 5/007* (2013.01); *B25J 9/1674* (2013.01); *A61G 7/1051* (2013.01); *A61H 2003/043* (2013.01); *A61H 2003/046* (2013.01); *A61H 2201/0188* (2013.01); *A61H 2201/0192* (2013.01); *A61H 2201/1207* (2013.01); *A61H 2201/165* (2013.01); *A61H 2201/1619* (2013.01); *A61H 2201/1635* (2013.01); *A61H 2201/5007* (2013.01)

(58) Field of Classification Search
CPC .. A61G 7/1017; A61G 7/1046; A61G 7/1051; A61G 7/1063–7/1065; A61H 3/04; A61H 2003/043; A61H 2003/046; A61H 2201/0188; A61H 2201/0192; A61H 2201/1207; A61H 2201/1619; A61H 2201/1635; A61H 2201/165; A61H 2201/5007; G05B 19/406; G05B 2219/40218; Y10S 901/01; Y10S 901/49
USPC ........................ 700/253, 250, 257; 901/1, 49
See application file for complete search history.

(56) References Cited

U.S. PATENT DOCUMENTS

| | | | |
|---|---|---|---|
| 2014/0341687 A1* | 11/2014 | Johnson | A61G 3/063 414/528 |
| 2015/0051519 A1* | 2/2015 | Morbi | A61H 3/00 601/26 |
| 2017/0202726 A1* | 7/2017 | Park | A61H 3/00 |

FOREIGN PATENT DOCUMENTS

| | | |
|---|---|---|
| JP | 2001-112102 | 4/2001 |
| JP | 2003-288105 | 10/2003 |
| JP | 2010-269418 | 12/2010 |
| JP | 2013-158386 | 8/2013 |

\* cited by examiner

| TIME (msec) | POSITION (m) | INITIAL POSITION FLAG | PROGRESS INFORMATION |
|---|---|---|---|
| t0 | p0 | 0 | 0 |
| t1 | p1 | 1 | 1 |
| t2 | p2 | 0 | 0 |
| .. | .. | .. | .. |
| tn | p10 | 0 | 0 |
| tn+1 | p11 | 0 | 0 |
| ⋮ | ⋮ | ⋮ | ⋮ |

| STATE ID | INPUT IF RECEPTION INFORMATION | INDICATION INFORMATION | PROGRESS INFORMATION |
|---|---|---|---|
| S1 | (1,0,0,0,0,0,1) | (0,0,0,0,0,0,0) | 0 |
| S2-1 | (1,0,0,0,1,0,1) | (1,0,0,0,1,0,1) | 0 |
| S2-2 | (1,1,0,0,0,1,1) | (1,1,0,0,0,1,1) | 1 |
| S3 | (1,1,0,0,0,0,1) | (1,1,0,0,0,0,1) | 0 |
| S4 | (1,1,0,0,0,1,1) | (1,1,0,0,0,1,1) | 0 |
| S5 | (1,0,1,1,0,1,1) | (1,0,1,1,0,1,1) | 0 |
| S6 | (1,0,1,1,0,0,1) | (1,0,1,1,0,0,1) | 0 |
| S7 | (1,0,1,1,0,0,1) | (1,0,1,1,0,0,1) | 0 |
| S8 | (1,0,0,0,?,?,1) | (1,0,0,0,?,?,1) | 0 |
| S10 | (1,0,0,0,1,0,1) | (1,0,0,0,1,0,1) | 0 |

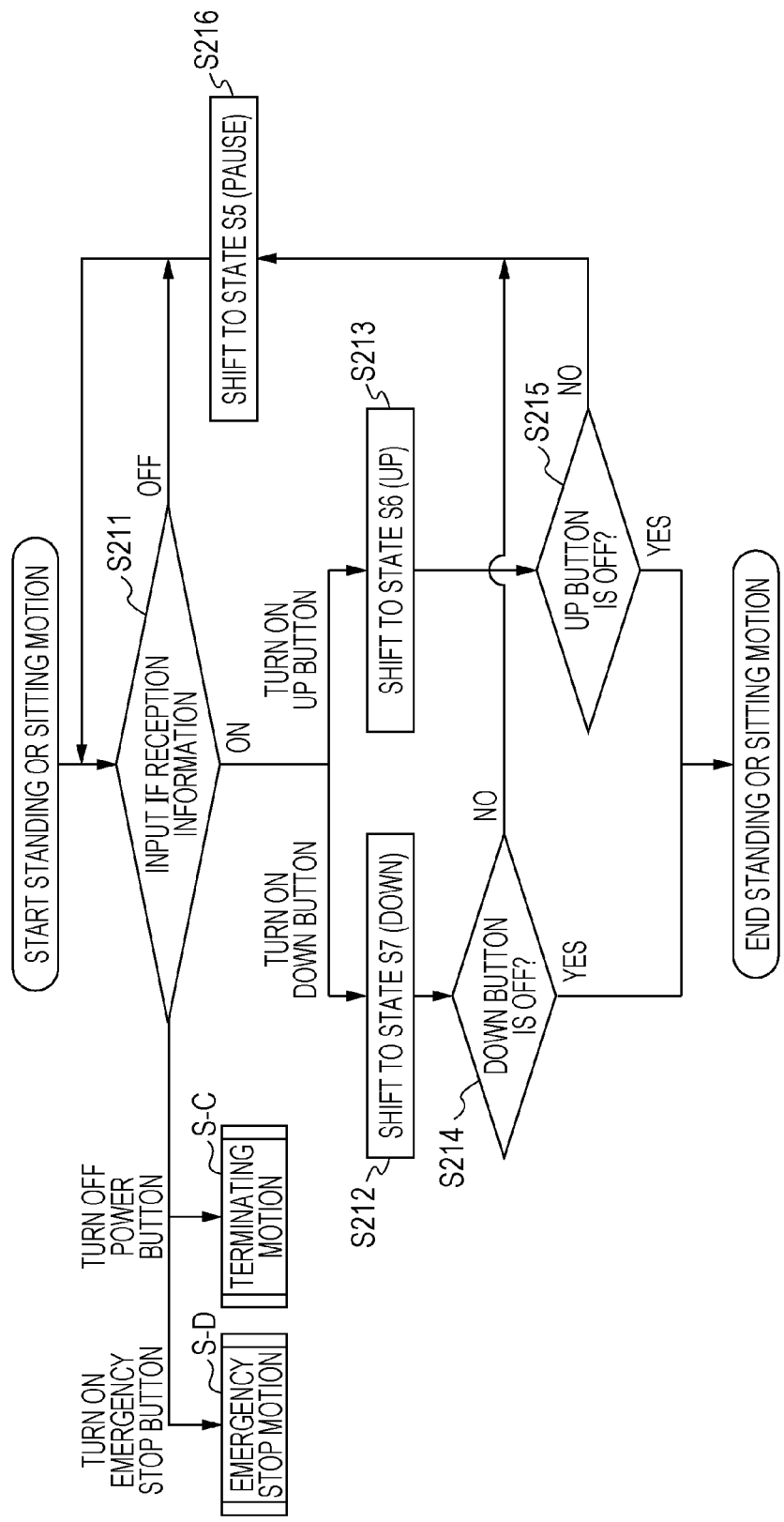

ial Field
ROBOT, METHOD FOR CONTROLLING ROBOT, AND RECORDING MEDIUM

BACKGROUND

1. Technical Field

The present disclosure relates to a robot, a method for controlling a robot, and a recording medium.

2. Description of the Related Art

A standing motion assist robot has been proposed that assists a care-receiver in performing a standing motion in accordance with preset path data while an operator is pressing an execution switch (see, for example, Japanese Unexamined Patent Application Publication No. 2013-158386). This standing motion assist robot supports the chest of a care-receiver with a supporter and controls three servo motors. Accordingly, in an automatic mode, the supporter is automatically driven along a predetermined path. In a manual mode, the speed and direction of the movement of the supporter can be changed by rotating a dial of a manual pulse generator in accordance with a motion of the care-receiver.

If a robot is caused to carry out an instruction input through an execution switch operated by an operator in any case, it may be inappropriate to assist a care-receiver in performing a motion. For example, when a robot that assists a care-receiver in performing a standing motion and a walking motion is assisting the care-receiver in performing a standing motion, if the care-receiver inputs an instruction to assist him/her in performing a walking motion by mistake, the robot performs a motion unintended by the care-receiver.

SUMMARY

One non-limiting and exemplary embodiment provides a robot, a method for controlling a robot, and a rerecording medium that suppress the performance of a motion unintended by an operator.

In one general aspect, the techniques disclosed here feature a robot including a tractor that includes a connector and that pulls a user through the connector; a walker that includes wheels for moving the tractor and one or more brakes for the wheels and that is coupled to the tractor; an input device that receives an instruction to operate at least one of the tractor and the walker; and a controller that, in response to reception of the instruction by the input device, determines whether or not to permit the tractor and/or the walker to perform a process based on the instruction, in accordance with a current state of the robot, the current state being one of a plurality of states of the robot. Each of the plurality of states of the robot is represented by using values of a plurality of items, one of the plurality of items being an item indicating whether or not the one or more brakes are applied to the wheels.

It should be noted that general or specific embodiments may be implemented as an apparatus, a system, a method, an integrated circuit, a computer program, a computer-readable recording medium, or any selective combination thereof. The computer-readable recording medium may be, for example, a nonvolatile recording medium such as a compact disc-read only memory (CD-ROM).

A robot according to an embodiment of the present disclosure is able to suppress the performance of a motion unintended by an operator. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14C is a flowchart illustrating a standing or sitting motion of the robot system according to the embodiment;

DETAILED DESCRIPTION

Figure 1A:
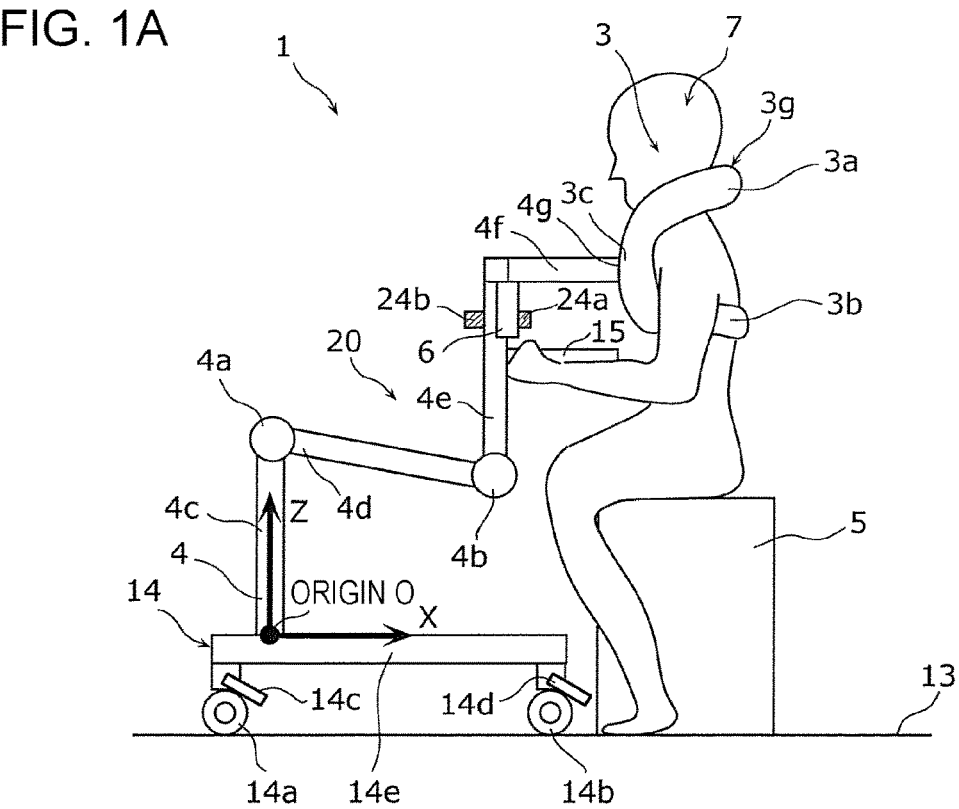
FIG. 1A is side view illustrating the overview of the configuration of a robot according to an embodiment and a care-receiver.

A robot according to an aspect of the present disclosure includes a tractor that includes a connector and that pulls a user through the connector; a walker that includes wheels for moving the tractor and one or more brakes for the wheels and that is coupled to the tractor; an input device that receives an instruction to operate at least one of the tractor and the walker; and a controller that, in response to reception of the instruction by the input device, determines whether or not to permit the tractor and/or the walker to perform a process based on the instruction, in accordance with a current state of the robot, the current state being one of a plurality of states of the robot, wherein each of the plurality of states of the robot is represented by using values of a plurality of items, one of the plurality of items being an item indicating whether or not the one or more brakes are applied to the wheels.

According to the foregoing aspect, whether or not the tractor and/or the walker performs a motion based on an instruction received by the input device is controlled in accordance with a current state of the tractor and the walker of the robot. Thus, if it is expected that the motion based on the instruction received by the input device is a motion unintended by an operator, the motion based on the instruction can be prohibited. Accordingly, the robot is able to suppress the performance of a motion unintended by the operator.

For example, the plurality of states include a first state in which power is not supplied to the robot, in the first state, if the one or more brakes are not applied to the wheels and if the power is supplied to the robot, the first state shifts to a second state included in the plurality of states, in the first state, if the one or more brakes are applied to the wheels and if the power is supplied to the robot, the first state shifts to a third state included in the plurality of states, in the second state, if the input device receives a first instruction to cause the tractor to locate the connector at a predetermined position where the connector is coupled to a hold mechanism that holds a body of the user, the controller does not permit the tractor to locate the connector at the predetermined position, and while the input device is receiving the first instruction in the third state, the controller permits the tractor to locate the connector at the predetermined position.

According to the foregoing aspect, the robot performs control not to move the tractor to an initial position in a state where brakes are not applied to the wheels. The tractor is moved to the initial position when the robot is coupled to the hold mechanism (and a care-receiver). In this case, if brakes are not applied to the wheels and the wheels freely rotate, an unintended motion may occur, for example, the robot and the care-receiver may fall down when the robot is coupled to the hold mechanism. Thus, in a state where brakes are not applied to the wheels, the robot performs control not to move the tractor to the initial position and is thereby able to suppress the performance of a motion unintended by an operator.

Also, according to the foregoing aspect, the robot performs control not to move the tractor on a certain path in a state where brakes are not applied to the wheels. The tractor is moved on the certain path when a care-receiver performs a standing or sitting motion. In this case, if brakes are not applied to the wheels and the wheels freely rotate, an unintended motion may occur, for example, the robot and the care-receiver may fall down when a standing or sitting motion is performed. Thus, in a state where brakes are not applied to the wheels, the robot performs control not to move the tractor on the certain path and is thereby able to suppress the performance of a motion unintended by an operator.

For example, if the input device receives the first instruction in the third state and if the tractor locates the connector at the predetermined position, the third state shifts to a fourth state, in the fourth state, while the input device is receiving a second instruction to cause the tractor to move the connector on a certain path, the controller permits the tractor to move the connector on the certain path and does not permit the walker to release the one or more brakes, in the fourth state, if the input device receives the second instruction, the fourth state shifts to a fifth state, and in the fourth state, if the input device receives a third instruction to cause the walker to release the one or more brakes, the controller permits the walker to release the one or more brakes and does not permit the tractor to move the connector on the certain path, and the fourth state shifts to a sixth state.

According to the foregoing aspect, the robot performs control not to move the tractor on a certain path while moving by using the walker. When the robot is moving by using the walker, the robot is coupled to the hold mechanism (and a care-receiver) and the care-receiver is walking. If the tractor moves in this case, an unintended motion may occur, for example, the robot and the care-receiver may fall down. Thus, when the robot is moving by using the walker, the robot performs control not to move the tractor on the certain path and is thereby able to suppress the performance of a motion unintended by an operator.

For example, if the input device receives, in the sixth state, a fourth instruction to cause the tractor to stop movement of the connector and to keep the connector stopped, the sixth state shifts to a seventh state, and in the seventh state, if the input device receives cancellation of the fourth instruction and also receives a fifth instruction to cause the walker to apply the one or more brakes to the wheels, the seventh state shifts to the third state.

According to the foregoing aspect, the robot receives input of an emergency stop instruction, and after that moves the tractor to the initial position upon cancellation of the emergency stop instruction. The time when input of the emergency stop instruction is received is the time when the robot is in some unintended state. The time when the emergency stop instruction is cancelled is the time when the robot has recovered from the unintended state. Thus, when the emergency stop instruction is cancelled, the robot may move the tractor to the initial position so as to couple the tractor to the hold mechanism (and the care-receiver) again, and thereby convenience enhances.

For example, the robot further includes an indicator that, in response to reception of the fifth instruction by the input device, indicates whether or not the controller permits the walker to apply the one or more brakes to the wheels.

According to the foregoing aspect, the robot is able to indicate motions that can be performed by the walker to an operator in accordance with a current state of the tractor and the walker. Accordingly, the operator is able to visually determine motions that can be performed by the walker and easily understand an operation interface.

A method for controlling a robot according to an aspect of the present disclosure includes receiving an instruction to operate at least one of a tractor and a walker, the tractor including a connector and pulling a user through the connector, the walker being coupled to the tractor, and the walker including wheels for moving the tractor and one or more brakes for the wheels; and in response to reception of the instruction, determining whether or not the robot permits the tractor and/or the walker to perform a process based on the instruction, in accordance with a current state of the robot, the current state being one of a plurality of states of the robot, wherein each of the plurality of states of the robot is represented by using values of a plurality of items, one of the plurality of items being an item indicating whether or not the one or more brakes are applied to the wheels.

Accordingly, advantages similar to those of the robot can be obtained.

A non-transitory computer-readable recording medium according to an aspect of the present disclosure stores a control program for causing a device including a processor to execute a process, the process including receiving an instruction to operate at least one of a tractor and a walker, the tractor including a connector and pulling a user through the connector, the walker being coupled to the tractor, and the walker including wheels for moving the tractor and one or more brakes for the wheels; and in response to reception of the instruction, determining whether or not the robot permits the tractor and/or the walker to perform a process based on the instruction, in accordance with a current state of the robot, the current state being one of a plurality of states of the robot, wherein each of the plurality of states of the robot is represented by using values of a plurality of items, one of the plurality of items being an item indicating whether or not the one or more brakes are applied to the wheels.

Accordingly, advantages similar to those of the robot can be obtained.

A robot according to an aspect of the present disclosure includes an input device that receives an instruction; a controller that determines a current state of the robot and whether or not to cause an operation based on the received instruction and the current state; a tractor that includes a connector, the tractor pulling a user through the connector; and a walker that is coupled to the tractor, the walker including wheels for moving the tractor and one or more brakes for the wheels, wherein the controller determines the current state is a first state when power to the robot is turned on without the one or more brakes being applied to the wheels, the first state remaining if the controller receives no instruction during the first state, wherein the controller determines the current state is a second state when the power to the robot is turned on with the one or more brakes being applied to the wheels, the second state remaining if the controller receives no instruction during the second state, wherein, when the current state is the first state and the received instruction is an instruction to apply the one or more brakes to the wheels, the controller causes the walker to apply the one or more brakes to the wheels and determines the current state is the second state, wherein, when the current state is the second state and the received instruction is a first instruction to cause the tractor to move the connector to a predetermined position where the connector is coupled to a hold mechanism that supports the user, the controller causes the tractor to move the connector to the predetermined position and determines the current state is a third state, and wherein, when the current state is the first state and the received instruction is the first instruction, the controller does not cause the tractor to move the connector to the predetermined position without changing the current state.

It should be noted that general or specific embodiments may be implemented as a system, a method, an integrated circuit, a computer program, a computer-readable recording medium such as a CD-ROM, or any selective combination thereof.

Hereinafter, an embodiment will be described in detail with reference to the attached drawings.

The embodiment described below is a general or specific example. The values, shapes, materials, components, locations and connection forms of the components, steps, and order of the steps described in the embodiment are examples and do not limit the present disclosure. Among the components according to the following embodiment, the components that are not described in an independent claim indicating the broadest concept will be described as optional components.

Embodiment

In this embodiment, a description will be given of a robot capable of suppressing the performance of a motion unintended by an operator. The robot according to this embodiment is a part of a robot system. The robot system is, for example, a standing/sitting motion assist system that assists a care-receiver in performing a standing or sitting motion.

Figure 1B:
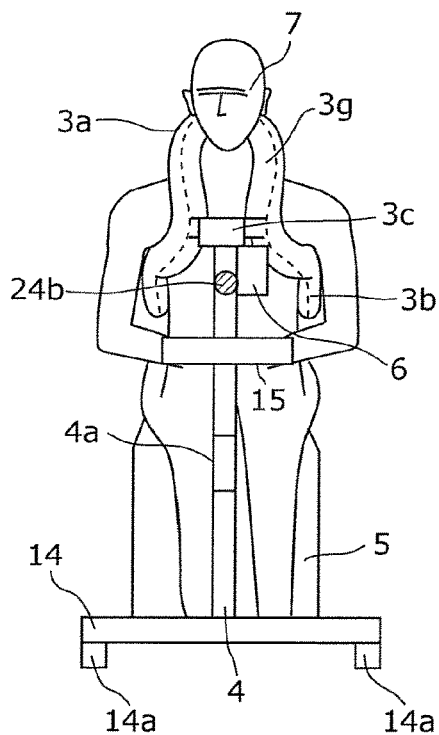
FIG. 1B is a front view illustrating the overview of the configuration of the robot according to the embodiment and the care-receiver in a state where the care-receiver is in a sitting position.
Figure 1C:
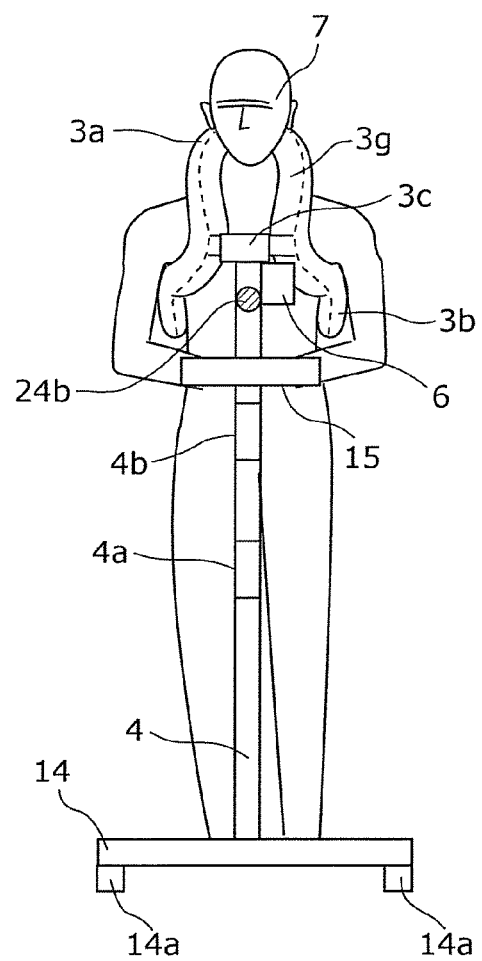
FIG. 1C is a front view illustrating the overview of the configuration of the robot according to the embodiment and the care-receiver in a state where the care-receiver is in a standing position.

FIGS. 1A to 1C illustrate an example of operations using a robot system 1, which is an example of the standing/sitting motion assist system according to this embodiment. Specifically, FIGS. 1A and 1B are a side view and a front view, respectively, illustrating a robot 20 that assists a care-receiver 7 in performing a motion from a sitting position to a standing position (hereinafter referred to as a standing motion) or a motion from a standing position to a sitting position (hereinafter referred to as a sitting motion) in a state where the care-receiver 7 is in a sitting position. The care-receiver 7 is seated on a seat 5 on a floor 13 and is thereby in a sitting position. FIG. 1C is a front view of the robot system 1 in a state where the care-receiver 7 is in a standing position.

Figure 2:
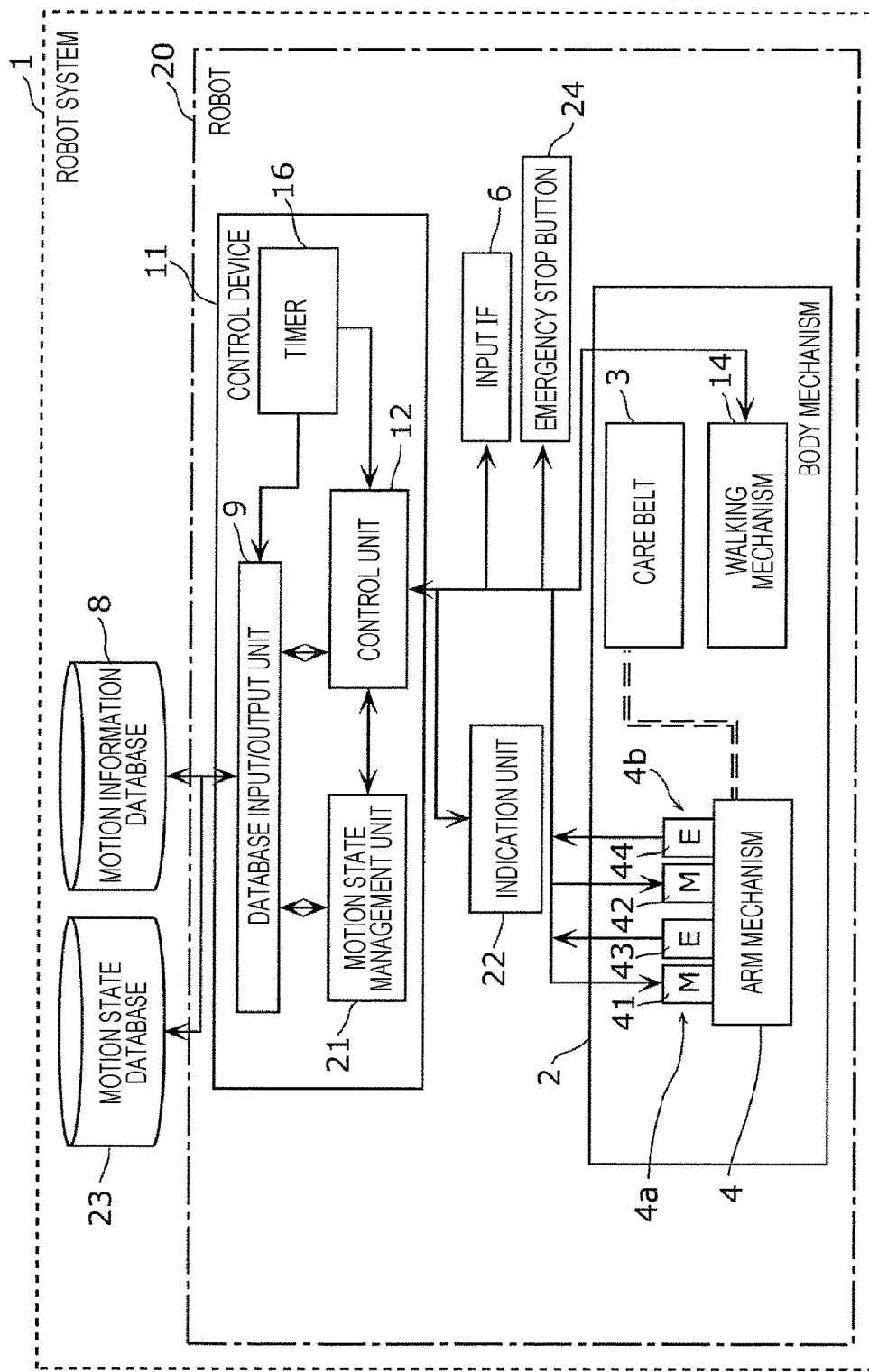
FIG. 2 is a block diagram illustrating the detailed configuration of a robot system according to the embodiment.
Figure 3A:
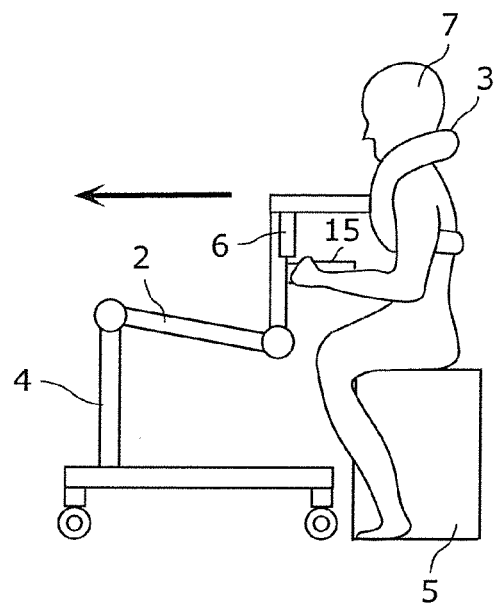
FIG. 3A is a first explanatory diagram illustrating the overview of a standing motion performed by the care-receiver using the robot system according to the embodiment.
Figure 3B:
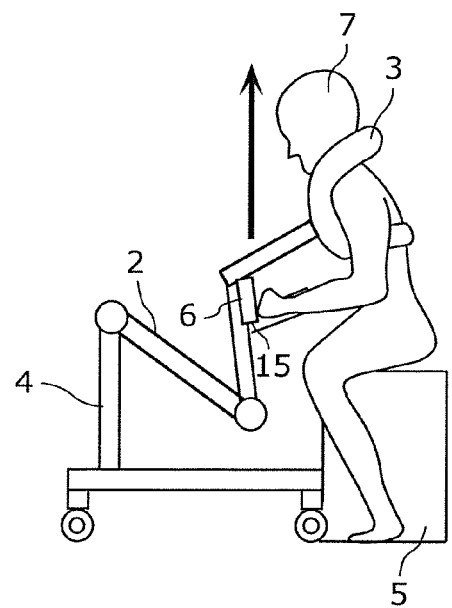
FIG. 3B is a second explanatory diagram illustrating the overview of the standing motion performed by the care-receiver using the robot system according to the embodiment.
Figure 3C:
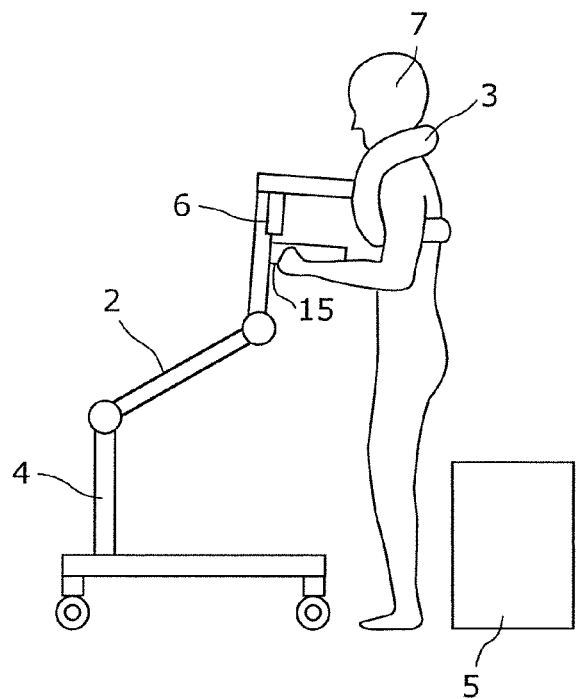
FIG. 3C is a third explanatory diagram illustrating the overview of the standing motion performed by the care-receiver using the robot system according to the embodiment.
Figure 4A:
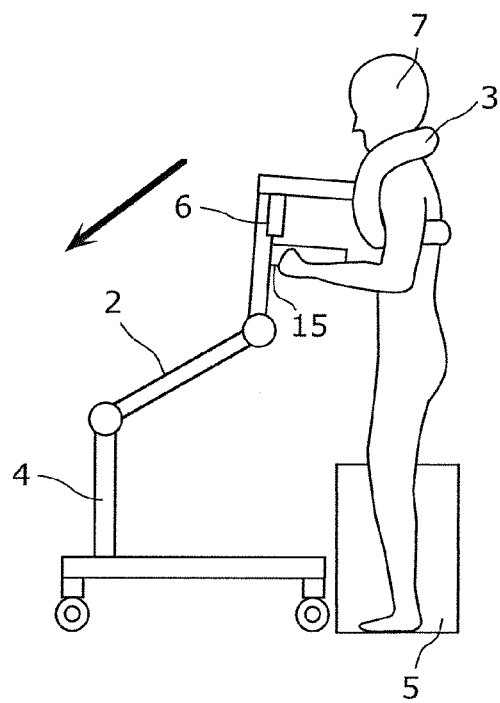
FIG. 4A is a first explanatory diagram illustrating the overview of a sitting motion performed by the care-receiver using the robot system according to the embodiment.
Figure 4B:
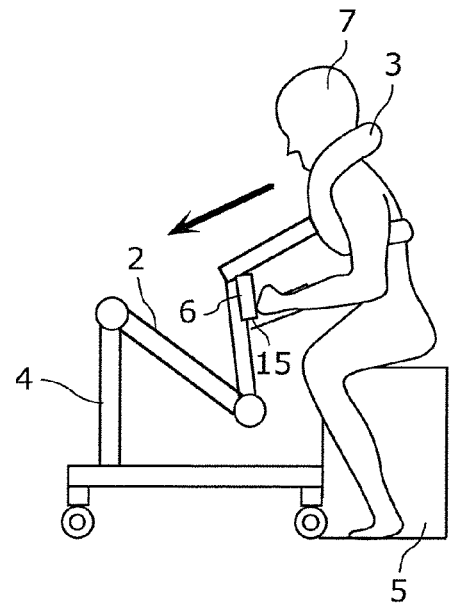
FIG. 4B is a second explanatory diagram illustrating the overview of the sitting motion performed by the care-receiver using the robot system according to the embodiment.
Figure 4C:
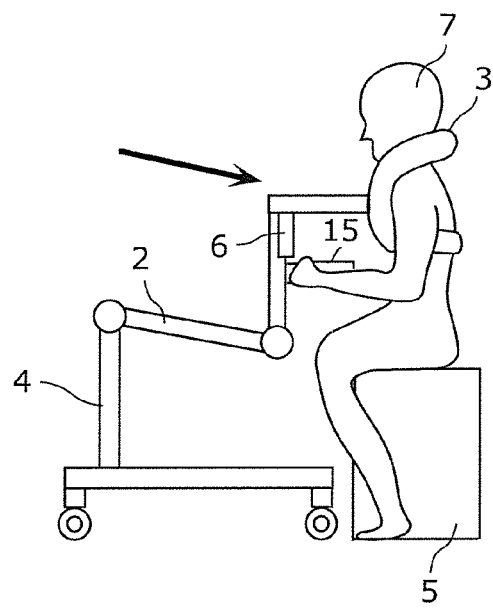
FIG. 4C is a third explanatory diagram illustrating the overview of the sitting motion performed by the care-receiver using the robot system according to the embodiment.

FIG. 2 is a block diagram illustrating the detailed configuration of the robot system 1 according to this embodiment. FIGS. 3A to 3C are explanatory diagrams illustrating the overview of a standing motion performed by the care-receiver 7 using the robot system 1 according to this embodiment. FIGS. 4A to 4C are explanatory diagrams illustrating the overview of a sitting motion performed by the care-receiver 7 using the robot system 1 according to this embodiment.

As illustrated in FIGS. 1A to 2 and so forth, the robot system 1 is an example of a standing/sitting motion assist system that assists the care-receiver 7 in performing a standing motion or sitting motion and includes the robot 20. As illustrated in FIG. 2, the robot system 1 includes a motion information database 8 and a motion state database 23, which are provided outside the robot 20. The motion information database 8 and the motion state database 23 may be provided inside the robot 20, instead of being provided outside the robot 20.

The robot 20 is located on the floor 13 and includes a body mechanism 2, a control device 11, an input interface (IF) 6, and an indication unit 22.

The body mechanism 2 includes an arm mechanism 4, a care belt 3, and a walking mechanism 14. The arm mechanism 4 includes at least a robot arm, which is an example of a traction mechanism.

The control device 11 includes a database input/output unit 9, a motion state management unit 21, a timer 16, and a control unit 12.

Care Belt 3

As illustrated in FIGS. 1A to 1C, the care belt 3 includes a hold mechanism 3g and a coupler 3c. The care belt 3 can be put on the care-receiver 7. The hold mechanism 3g includes at least a first holder 3a capable of holding either or both of a neck portion and a back portion of the care-receiver 7, and a second holder 3b capable of holding a waist portion of the care-receiver 7. For example, the coupler 3c can be located near a chest portion of the care-receiver 7 when the hold mechanism 3g is put on the care-receiver 7. The coupler 3c is coupled to the hold mechanism 3g and can be coupled to one end (back end) of the arm mechanism 4 (described below) in an attachable/detachable manner.

As illustrated in FIGS. 1A to 1C, the coupler 3c is coupled to one end of the arm mechanism 4, and is located at a position near the center of the chest portion of the care-receiver 7 and near the boundary between the first holder 3a and the second holder 3b so as to extend over a region between end portions of the first holder 3a and end portions of the second holder 3b that are coupled to each other. The coupler 3c and the one end (back end) of the arm mechanism 4 are coupled to each other by, for example, using a screw to fix them. Any other methods may be used to couple the coupler 3c and the one end (back end) of the arm mechanism 4 to each other. The coupler 3c may be composed of a less elastic material than the first holder 3a and the second holder 3b. Accordingly, elongation of the coupler 3c can be prevented when the care belt 3 is pulled by the arm mechanism 4, and thereby an external force from the arm mechanism 4 can be more reliably transferred to the body of the care-receiver 7 by using the hold mechanism 3g.

Walking Mechanism 14

The walking mechanism 14 includes wheels and performs a motion to move the robot 20 by using the wheels. The walking mechanism 14 corresponds to a walker.

The walking mechanism 14 includes a rectangular plate 14e, a pair of front wheels 14a, a pair of rear wheels 14b, front-wheel brakes 14c, and rear-wheel brakes 14d, and is located on the floor 13. The pair of front wheels 14a and the pair of rear wheels 14b are specific examples of wheels. The front-wheel brakes 14c and the rear-wheel brakes 14d are specific examples of wheel brakes.

The pair of front wheels 14a, which are rotatable, are located at a pair of front corners of the rectangular plate 14e. The pair of rear wheels 14b, which are rotatable, are located at a pair of rear corners of the rectangular plate 14e. The front-wheel brakes 14c brake the front wheels 14a. The rear-wheel brakes 14d brake the rear wheels 14b. The arm mechanism 4 is located on an upper portion of the walking mechanism 14. That is, the arm mechanism 4 stands at a front center portion of the rectangular plate 14e and is supported by the rectangular plate 14e.

For example, in the state illustrated in FIG. 3C, the pair of front wheels 14a and the pair of rear wheels 14b rotate when the care-receiver 7 applies a force in the forward direction (the leftward direction in FIG. 3C) to the robot 20, and accordingly the robot 20 functions as a walker to assist the care-receiver 7 in walking. In this example, the pair of front wheels 14a and the pair of rear wheels 14b rotate when the care-receiver 7 pushes the robot 20. Alternatively, for example, a motor may be provided to either or both of the pair of front wheels 14a and the pair of rear wheels 14b so that the motor assists a pushing force applied to the robot 20 by the care-receiver 7. Accordingly, the care-receiver 7 can move easily.

The front-wheel brakes 14c and the rear-wheel bakes 14d may be electromagnetic brakes or the like that perform brake ON or OFF by using an electric signal of an instruction from the input IF 6, for example. In this case, brakes can be applied to the front wheels 14a by turning on the front-wheel brakes 14c, and brakes can be applied to the rear wheels 14b by turning on the rear-wheel brakes 14d. The brakes of the front wheels 14a can be released by turning off the front-wheel brakes 14c, and the brakes of the rear wheels 14b can be released by turning off the rear-wheel brakes 14d. In this embodiment, the pair of front wheels 14a and the pair of rear wheels 14b are provided as an example, but another wheel may be further provided at the center of the rectangular plate 14e. The number and size of wheels are not limited to those described above.

Arm Mechanism 4

The arm mechanism 4 is an example of a traction mechanism (also referred to as a tractor) that pulls the care-receiver 7. The arm mechanism 4 is located on an upper portion of the walking mechanism 14. A connector at an end of the arm mechanism 4 is coupled to the hold mechanism 3g (corresponding to a hold mechanism) through the coupler 3c.

For example, the arm mechanism 4 is a robot arm with two degrees of freedom. The arm mechanism 4 includes a first motor 41, a first encoder 43 that detects the number of rotations (rotation angle) of a rotation shaft of the first motor 41, a second motor 42, and a second encoder 44 that detects the number of rotations (rotation angle) of a rotation shaft of the second motor 42. The control device 11 controls the first motor 41 and the second motor 42 on the basis of position information that is obtained by converting rotation angle information from the first encoder 43 and the second encoder 44 into position information of the arm mechanism 4. With this control, for example, the arm mechanism 4 drives the robot system 1 to assist the care-receiver 7 in a sitting position in moving his/her buttocks away from the seat 5, as illustrated in FIGS. 3A to 3C. For this purpose, the arm mechanism 4 operates to simultaneously pull the first holder 3a and the second holder 3b of the hold mechanism 3g in the forward direction relative to the care-receiver 7 and then in the upward direction.

Furthermore, as illustrated in FIGS. 4A to 4C, the arm mechanism 4 drives the robot system 1 to assist the care-receiver 7 in a standing position in sitting on the seat 5. For this purpose, the arm mechanism 4 operates to simultaneously pull the first holder 3a and the second holder 3b of the hold mechanism 3g at least in the downward direction relative to the care-receiver 7, then in a downward and slightly forward direction, and then in a downward and slightly backward direction.

More specifically, the arm mechanism 4 includes a robot arm. The robot arm includes a first arm 4c, a second arm 4d, a third arm 4e, a fourth arm 4f, a first drive unit 4a, and a second drive unit 4b.

A lower end of the first arm 4c is fixed to a front center portion of the rectangular plate 14e so as to stand upward on the rectangular plate 14e or to lie downward from the rectangular plate 14e. A front end of the second arm 4d is rotatably coupled to an upper end of the first arm 4c through a first joint that includes the first drive unit 4a therein.

A back end of the second arm 4d is rotatably coupled to a lower end of the third arm 4e through a second joint that includes the second drive unit 4b therein.

An upper end of the third arm 4e is fixed to a front end of the fourth arm 4f so that the axial directions of the third arm 4e and the fourth arm 4f are orthogonal to each other and that the third arm 4e and the fourth arm 4f form an L-shape.

A coupler 4g that is coupled to the coupler 3c of the care belt 3 in an attachable/detachable manner is located at a back end of the fourth arm 4f.

The first drive unit 4a is located in the first joint between the first arm 4c and the second arm 4d and includes, for example, the first motor 41 that rotates the second arm 4d relative to the first arm 4c, and the first encoder 43 that detects the rotation angle information thereof. Thus, the first drive unit 4a is able to rotate the second arm 4d by a predetermined angle relative to the first arm 4c under the control performed by the control unit 12 described below.

The second drive unit 4b is located in the second joint between the second arm 4d and the third arm 4e and includes, for example, the second motor 42 that rotates the third arm 4e relative to the second arm 4d, and the second encoder 44 that detects the rotation angle information thereof. The rotation angle information from the first encoder 43 and the second encoder 44 is converted into the position information of the arm mechanism 4 and is used as position information by the control unit 12. Thus, the second drive unit 4b is able to rotate the third arm 4e by a predetermined angle relative to the second arm 4d so that the third arm 4e is moved to a desired position under the control performed by the control unit 12 described below.

A handle 15 protrudes in the backward direction (toward the care-receiver 7) from a middle portion of the third arm 4e. The care-receiver 7 is able to grasp and hold the handle 15 with his/her both hands when performing a sitting motion or standing motion. The handle 15 may have a length that allows the care-receiver 7 to place his/her elbows on the handle 15. Accordingly, the handle 15 functions as a handle when the care-receiver 7 stands up and functions as an elbow rest on which elbows are placed when the care-receiver 7 walks, and thereby the care-receiver 7 is able to walk more stably. Furthermore, the fourth arm 4f may include a cushioning member made of urethane foam or the like in an upper portion thereof. Accordingly, even if the care-receiver 7 falls forward and the face or upper body of the care-receiver 7 touches the fourth arm 4f, the impact can be reduced.

Input IF 6, Emergency Stop Button 24

The input IF 6 and an emergency stop button 24 are interfaces for receiving input of an instruction to perform a motion of the arm mechanism 4 and a motion of the walking mechanism 14. The input IF 6 and the emergency stop button 24 correspond to an input device. The emergency stop button 24 corresponds to an emergency stop device.

The input IF 6, such as an operation panel on which buttons or the like are arranged, is located on a front portion of the fourth arm 4f so as to protrude downward. With this location of the input IF 6, the care-receiver 7 in a sitting position is able to operate the input IF 6 from a side of the arm mechanism 4. The input IF 6 is an input interface for controlling the motions of the arm mechanism 4 and the walking mechanism 14 of the robot 20. The input IF 6 corresponds to an input device.

Figures 5, 6:
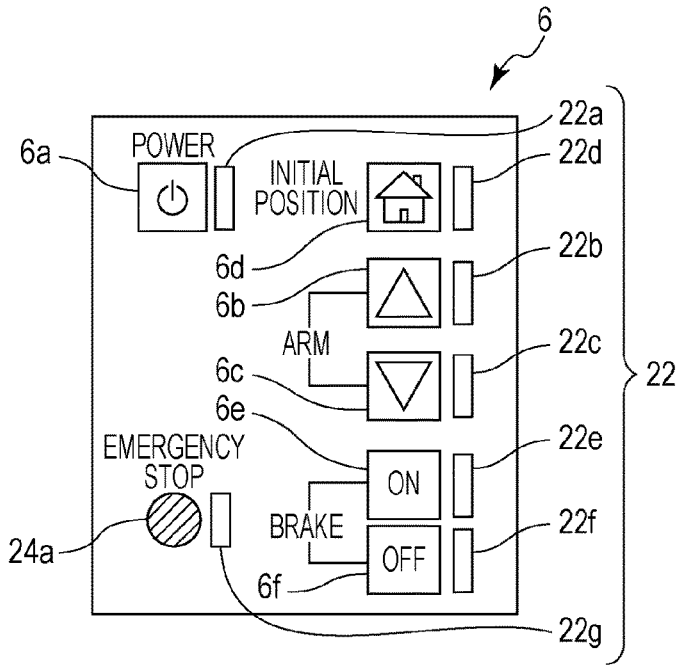
FIG. 5 is an explanatory diagram illustrating the overview of an input interface according to the embodiment.
FIG. 6 is an explanatory diagram illustrating an example of information in a motion information database according to the embodiment.

FIG. 5 illustrates an example of the input IF 6. In the input IF 6, a power button 6a for the robot system 1, a move-to-initial-position button 6d, an up button 6b, a down button 6c, a brake ON button 6e, a brake OFF button 6f, and so forth are arranged, which may be operated independently of one another.

The power button 6a is a button to turn on or off the power of the robot 20. Upon the power button 6a being operated, the input IF 6 receives input of an instruction to turn on or off the power of the robot system 1. The power button 6a is, for example, a latch-type push button. Upon the power button 6a being pressed to be latched, the power of the robot 20 is turned on. Upon the latched power button 6a being released, the power of the robot 20 is turned off.

The move-to-initial-position button 6d is a button to move the arm mechanism 4 to a position predetermined as an initial position. Upon the move-to-initial-position button 6d being operated, the input IF 6 receives input of an instruction to move the arm mechanism 4 to the initial position. The move-to-initial-position button 6d is, for example, a non-latch-type push button. The initial position is, for example, a position where the coupler 4g of the arm mechanism 4 is in contact with the front surface of the body of the care-receiver 7 (the position illustrated in FIG. 3A).

Figures 7, 8:
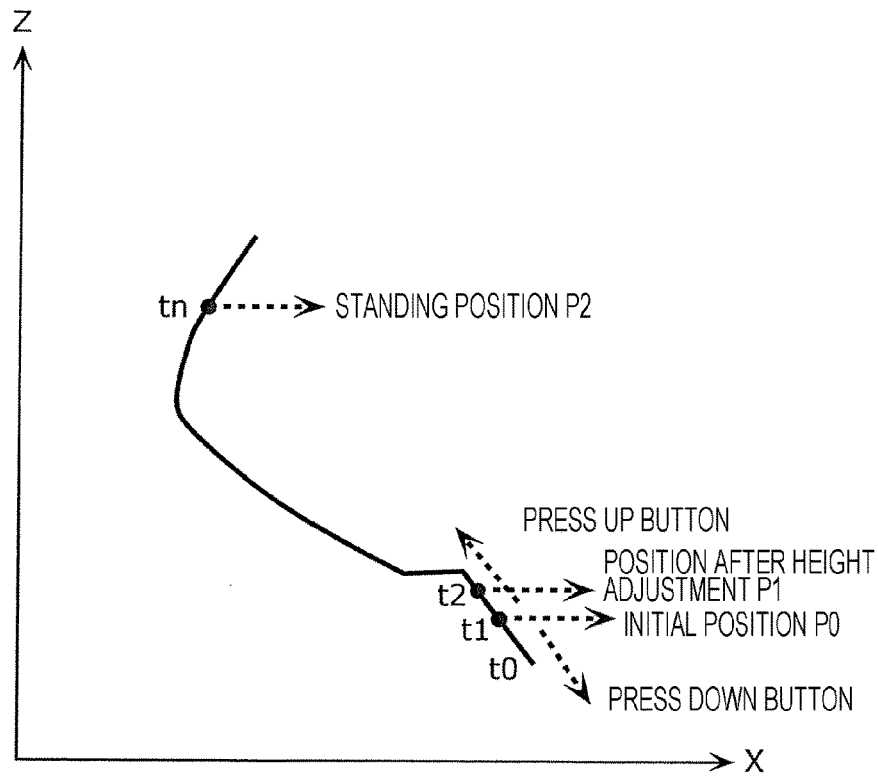
FIG. 7 is a graph illustrating motion information according to the embodiment.
FIG. 8 is an explanatory diagram illustrating an example of information in a motion state database according to the embodiment.

The up button 6b is a button to move the arm mechanism 4 in the upward direction along the path illustrated in FIG. 7. Upon the up button 6b being operated, the input IF 6 receives input of an instruction to move the arm mechanism 4 in the upward direction along the path illustrated in FIG. 7. The up button 6b is used to, for example, assist the care-receiver 7 in performing a standing motion. The up button 6b is, for example, a non-latch-type push button.

The down button 6c is a button to move the arm mechanism 4 in the downward direction along the path illustrated in FIG. 7. Upon the down button 6c being operated, the input IF 6 receives input of an instruction to move the arm mechanism 4 in the downward direction along the path illustrated in FIG. 7. The down button 6c is used to, for example, assist the care-receiver 7 in performing a sitting motion. The down button 6c is, for example, a non-latch-type push button.

The brake ON button 6e is a button to activate both the front-wheel brakes 14c and the rear-wheel brakes 14d. Upon the brake ON button 6e being operated, the input IF 6 receives input of an instruction to activate both the front-wheel brakes 14c and the rear-wheel brakes 14d. The brake ON button 6e is, for example, a non-latch-type push button.

The brake OFF button 6f is a button to deactivate both the front-wheel brakes 14c and the rear-wheel brakes 14d. Upon the brake OFF button 6f being operated, the input IF 6 receives input of an instruction to deactivate both the front-wheel brakes 14c and the rear-wheel brakes 14d. The brake OFF button 6f is, for example, a non-latch-type push button.

For example, the up button 6b and the down button 6c are based on so-called hold-to-run control, in which the function assigned to the button is carried out only when the button is being operated. That is, the up button 6b is controlled so that the arm mechanism 4 moves upward only when the button is kept pressed and that the arm mechanism 4 stops moving upon release of the button. The down button 6c is controlled so that the arm mechanism 4 moves downward only when the button is kept pressed and that the arm mechanism 4 stops moving upon release of the button. Note that the present disclosure is not limited to the foregoing control.

The input IF 6 may be removable from the front portion of the fourth arm 4f. In this case, the care-receiver 7 or a care-giver is able to hold the input IF 6 with his/her hand and use it as a remote control.

The emergency stop button 24 is provided in at least one of the arm mechanism 4 and the input IF 6 and is used to stop the motion of the robot system 1. Upon the emergency stop button 24 being operated, input of an emergency stop instruction is received. A plurality of emergency stop buttons 24 may be provided in the robot 20. Hereinafter, a description will be given of a case where the robot 20 includes two emergency stop buttons 24, that is, emergency stop buttons 24a and 24b. The emergency stop button 24a is provided in the input IF 6, whereas the emergency stop button 24b is provided in the arm mechanism 4. In the following description, the emergency stop buttons 24a and 24b are not distinguished from each other and will be referred to as an emergency stop button 24.

The care-giver or the care-receiver 7 who is operating the robot system 1 is able to press the emergency stop button 24 any time when he/she wants to stop the motion of the robot system 1. Upon the emergency stop button 24 being pressed, the robot system 1 is brought into an emergency stop state, and the arm mechanism 4 stops moving, for example. The emergency stop button 24 is kept pressed. To cancel the emergency stop state, it is necessary to rotate the emergency stop button 24 clockwise (or counterclockwise) with the button being pressed. When the emergency stop button 24 is rotated with the button being pressed, the emergency stop button 24 pops up and the emergency stop state is cancelled.

Indication Unit 22

The indication unit 22 indicates whether or not input to the input IF 6 (the power button 6a, the move-to-initial-position button 6d, the up button 6b, the down button 6c, the brake ON button 6e, and the brake OFF button 6f of the input IF 6) and the emergency stop button 24 is to be received. In other words, the indication unit 22 indicates whether or not the arm mechanism 4 and the walking mechanism 14 are permitted to perform a motion based on input of an instruction received by the input IF 6 (the power button 6a, the move-to-initial-position button 6d, the up button 6b, the down button 6c, the brake ON button 6e, and the brake OFF button 6f of the input IF 6) and the emergency stop button 24. In other words, the indication unit 22 indicates whether or not the arm mechanism 4 and the walking mechanism 14 are allowed to perform a motion based on input of the instruction.

More specifically, the indication unit 22 indicates whether or not the arm mechanism 4 and the walking mechanism 14 are allowed to perform a motion in accordance with input of one or more of an instruction to turn on or off the power of the robot 20, an instruction to move the arm mechanism 4 to the initial position, an instruction to move the arm mechanism 4 on a certain path, an instruction to apply or release brakes, and an emergency stop instruction.

For example, as illustrated in FIG. 5, the indication unit 22 includes a power-button lamp 22a, an up-button lamp 22b, a down-button lamp 22c, a move-to-initial-position-button lamp 22d, a brake ON lamp 22e, a brake OFF lamp 22f, and an emergency-stop-button lamp 22g. The power-button lamp 22a corresponds to the power button 6a. The move-to-initial-position-button lamp 22d corresponds to the move-to-initial-position button 6d. The up-button lamp 22b corresponds to the up button 6b. The down-button lamp 22c corresponds to the down button 6c. The brake ON lamp 22e corresponds to the brake ON button 6e. The brake OFF lamp 22f corresponds to the brake OFF button 6f. The emergency-stop-button lamp 22g corresponds to the emergency stop button 24.

These lamps indicate whether or not the respective buttons are able to receive input. Specifically, the indication unit 22 turns on the lamp corresponding to the button that receives input among the power button 6a, the move-to-initial-position button 6d, the up button 6b, the down button 6c, the brake ON button 6e, the brake OFF button 6f, and the emergency stop button 24, and turns off the lamp corresponding to the button that does not receive input. The turn on and off of each lamp is controlled on the basis of the information stored as "indication information" in the motion state database 23 described below. For each of the plurality of lamps included in the indication unit 22, the lamp is turned off when the indication information is "0" and the lamp is turned on when the indication information is "1".

A description has been given of an example in which the indication unit 22 corresponds to lamps located near the respective buttons. Alternatively, each button and a corresponding lamp may be integrated together and the button itself may light up. Alternatively, the indication unit 22 may be a thing other than lamps. For example, a voice message may be output when a button capable of receiving input is pressed.

Timer 16

The timer 16 outputs, at a predetermined time interval (for example, an interval of 1 msec), an instruction to operate the database input/output unit 9 and the control unit 12 to the database input/output unit 9 and the control unit 12.

Database Input/Output Unit 9

The database input/output unit 9 receives data (information) from and outputs data to the motion information database 8, the motion state database 23, the control unit 12, and the motion state management unit 21.

Motion Information Database 8

Control by the control unit 12 (described below) is performed on the basis of an instruction from the timer 16, and position information of the arm mechanism 4 (position information obtained by converting rotation angle information from each of the first encoder 43 and the second encoder 44 to position information of the arm mechanism 4) is generated at a predetermined time interval (for example, at an interval of 1 msec). The generated pieces of position information are output as motion information to the motion information database 8 through the database input/output unit 9 with time and are stored as motion information in the motion information database 8. In this embodiment, the motion information is generated in advance by the input IF 6 or the like and is stored.

FIG. 6 is an explanatory diagram illustrating an example of information in the motion information database 8 according to this embodiment. FIG. 7 is a graph of motion information according to this embodiment. A detailed description will be given of the information in the motion information database 8.

(1) The column "time" shows information about the time when the arm mechanism 4 is operating. The time is represented in milliseconds (msec).

(2) The column "position" shows position information of the arm mechanism 4, which is obtained by converting angle information detected by the first encoder 43 and the second encoder 44 of the arm mechanism 4. Specifically, as illustrated in FIG. 1A, the position information is represented by relative coordinates of the position of the coupler 4g with respect to the origin O corresponding to one end of the arm mechanism 4 on the plane defined by an x-axis in which the direction opposite to the moving direction of the robot system 1 is positive and a z-axis in which the upward direction is positive. The position is represented in meters (m). The graph obtained by plotting the positions shown in the column "position" corresponds to the path illustrated in FIG. 7.

Figure 9A:
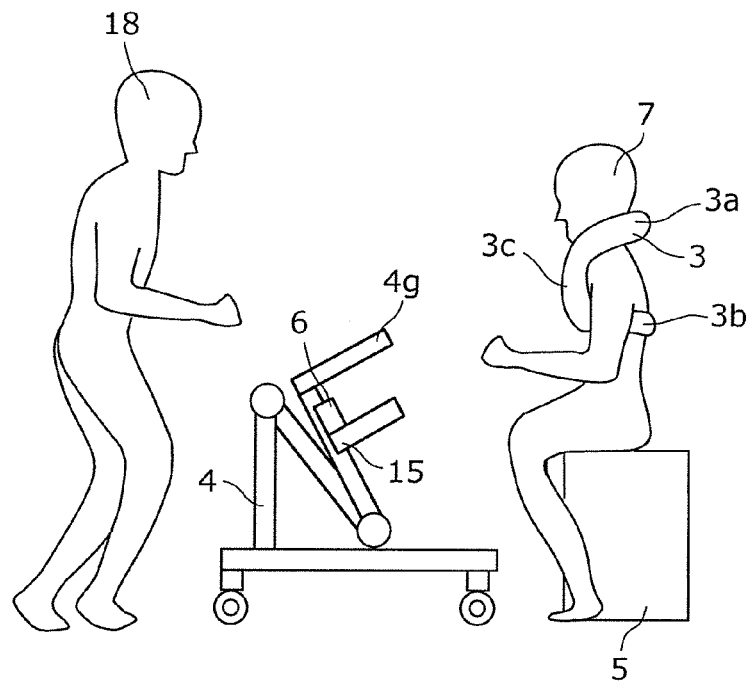
FIG. 9A is an explanatory diagram illustrating a motion of the robot system according to the embodiment.
Figure 9B:
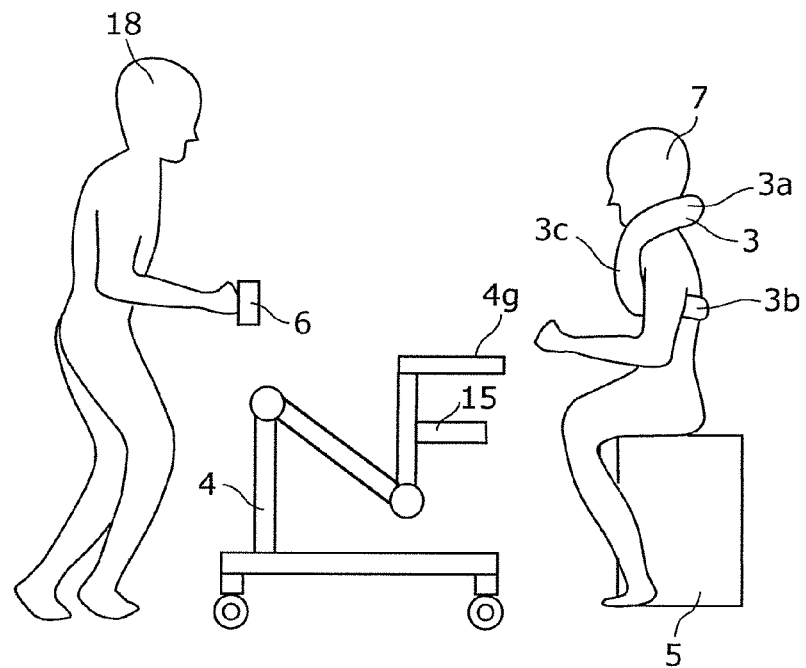
FIG. 9B is an explanatory diagram illustrating a motion of the robot system according to the embodiment.

(3) The column "initial position flag" stores a flag indicating the coordinates of an initial position of the arm mechanism 4 when the arm mechanism 4 is moved from a folded and stored position as illustrated in FIG. 9A to the initial position as illustrated in FIG. 9B. "0" or "1" is stored as the initial position flag. The position at the time when the initial position flag is set to "1" is set as the initial position. The position at the time when the initial position flag is set to "0" is not the initial position.

(4) The column "progress information" stores information about the progress of the motion of the robot system 1. "1" is stored as the progress information at the time corresponding to the current position of the robot system 1, and "0" is stored as the progress information at the other times. When a movement to the initial position is not completed, "0" is stored for all the times. Just after the movement to the initial position is completed, "1" is stored as the progress information at the same time as the time when "1" is stored as the initial position flag.

Motion State Database 23

The motion state management unit 21 determines the motion state of the robot system 1 on the basis of an instruction from the input IF 6 or the emergency stop button 24, and stores the determined motion state in the motion state database 23 through the database input/output unit 9. The motion state management unit 21 corresponds to a state obtainer.

FIG. 8 is an explanatory diagram illustrating an example of information in the motion state database 23. A detailed description will be given of the information in the motion state database 23.

(1) The column "state ID" stores ID numbers representing the motion states of the robot system 1. S1 to S10 are defined as state IDs. Each state ID will be described below.

(2) The column "input IF reception information" stores, for each motion state of the robot system 1, information indicating whether or not input to the input IF 6 (the power button 6a, the move-to-initial-position button 6d, the up button 6b, the down button 6c, the brake ON button 6e, and the brake OFF button 6f of the input IF 6) and the emergency stop button 24 is to be received. For each motion state of the robot system 1, "1" is stored if input is to be received in the state, whereas "0" is stored if input is not to be received. For example, information indicating whether or not input to the power button 6a, the move-to-initial-position button 6d, the up button 6b, the down button 6c, the brake ON button 6e, the brake OFF button 6f, and the emergency stop button 24 is to be received is to be stored in the form of (1, 1, 0, 0, 1, 0, 1) with separators ",".

(3) The column "indication information" stores, for each motion state of the robot system 1, information for indicating whether or not input to the input IF 6 (the power button 6a, the move-to-initial-position button 6d, the up button 6b, the down button 6c, the brake ON button 6e, and the brake OFF button 6f of the input IF 6) and the emergency stop button 24 is possible. "1" is stored to indicate that input is possible, whereas "0" is stored to indicate that input is impossible. For example, indication information indicating whether or not input to the power button 6a, the move-to-initial-position button 6d, the up button 6b, the down button 6c, the brake ON button 6e, the brake OFF button 6f, and the emergency stop button 24 is possible is stored in the form of (1, 1, 0, 0, 1, 0, 1) with separators ",". When "1" is stored as indication information, the corresponding one of the power-button lamp 22a, the move-to-initial-position-button lamp 22d, the up-button lamp 22b, the down-button lamp 22c, the brake ON lamp 22e, the brake OFF lamp 22f, and the emergency-stop-button lamp 22g illustrated in FIG. 5 is turned on. When "0" is stored as indication information, the corresponding one of these lamps is turned off.

(4) The column "progress information" stores information about the progress in a current state. "1" is stored for the current state, whereas "0" is stored for the other states.

Motion State Management Unit 21, Control Unit 12

Figure 12:
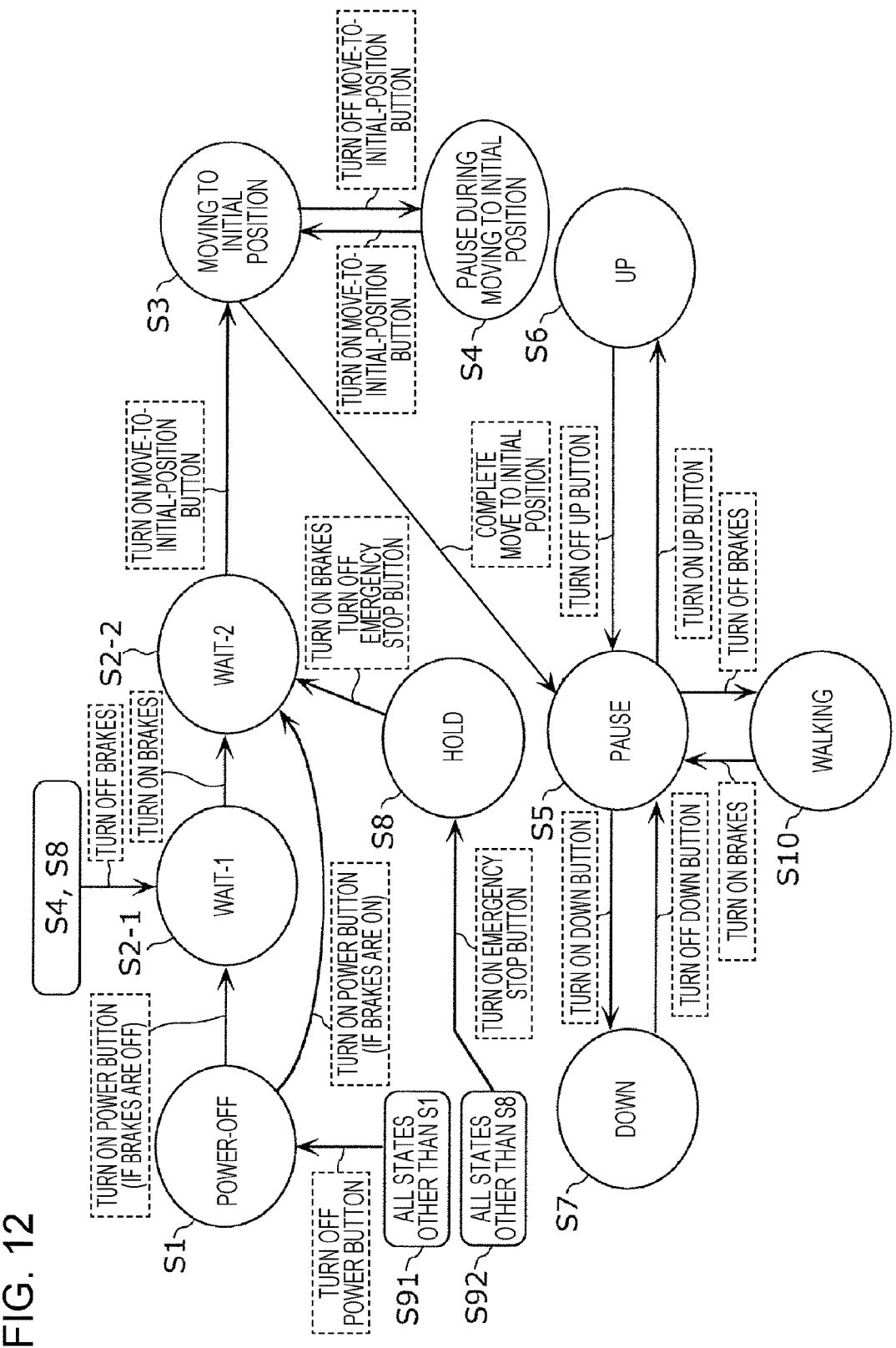
FIG. 12 is a state transition diagram of a control unit according to the embodiment.
Figure 13:
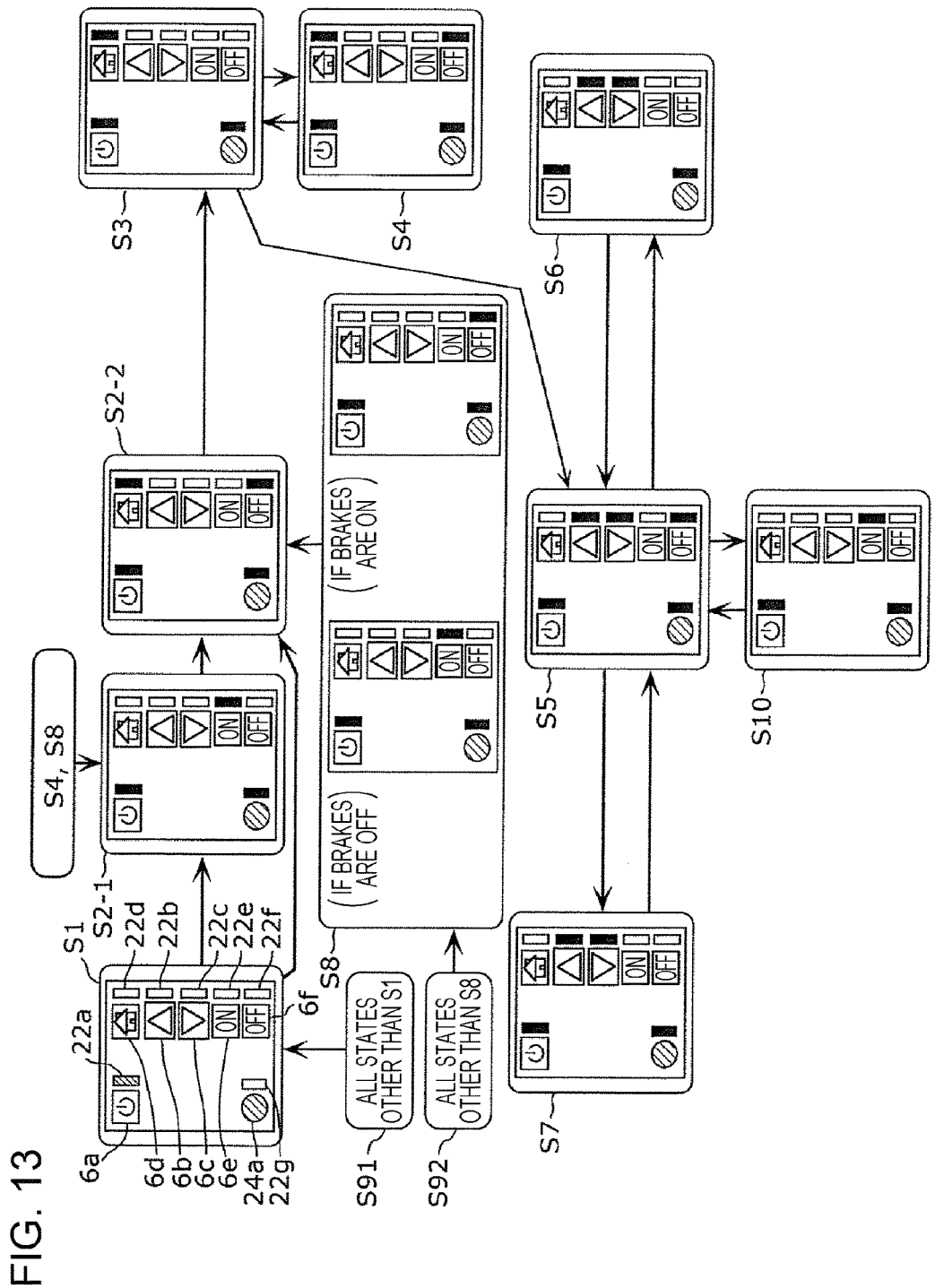
FIG. 13 is an explanatory diagram illustrating state transition of the control unit and an indication unit according to the embodiment.

The motion state management unit 21 determines the motion state of the robot system 1 on the basis of instructions from the input IF 6 and the emergency stop button 24 and stores the motion state in the motion state database 23 through the database input/output unit 9. As an example, a state transition diagram of the robot system 1 is illustrated in FIG. 12. The state of the robot system 1 may be simply referred to as the state of the robot.

When the input IF 6 receives an instruction, the control unit 12 determines whether or not to permit the arm mechanism 4 and/or the walking mechanism 14 to perform a process based on the instruction, in accordance with the current state of the robot system 1, which is one of a plurality of states of the robot system 1. The control unit 12 corresponds to a controller.

Specifically, the control unit 12 determines whether or not to permit the process based on the instruction in the following manner.

(a) For example, in a power-off state (state S1 described below), if one or more brakes are not applied to the wheels and if power is supplied to the robot system 1, the control unit 12 shifts the state of the robot system 1 from the power-off state to a wait-1 state (state S2-1 described below) included in the plurality of states. In the power-off state, if one or more brakes are applied to the wheels and if power is supplied to the robot system 1, the control unit 12 shifts the state of the robot system 1 from the power-off state to a wait-2 state (state S2-2 described below). In the wait-2 state, if the input IF 6 receives a first instruction to cause the arm mechanism 4 to locate the connector at a predetermined position for coupling the connector to the hold mechanism 3g that holds the body of the user, the control unit 12 does not permit the arm mechanism 4 to locate the connector at the predetermined position. While the input IF 6 is receiving the first instruction in the wait-2 state, the control unit 12 permits the arm mechanism 4 to locate the connector at the predetermined position.

(b) For example, if the input IF 6 receives the first instruction in the wait-2 state and if the arm mechanism 4 locates the connector at the predetermined position, the control unit 12 shifts the state of the robot system 1 from the wait-2 state to a pause state (state S5 described below). In the pause state, while the input IF 6 is receiving a second instruction to cause the arm mechanism 4 to move the connector on a certain path, the control unit 12 permits the arm mechanism 4 to move the connector on the certain path, does not permit the walking mechanism 14 to release one or more brakes, and shifts the state of the robot system 1 from the pause state to an "up" state (state S6 described below) or a "down" state (state S7 described below). In the pause state, if the input IF 6 receives a third instruction to cause the walking mechanism 14 to release one or more brakes, the control unit 12 permits the walking mechanism 14 to release the one or more brakes, does not permit the arm mechanism 4 to move the connector on the certain path, and shifts the state of the robot system 1 from the pause state to a walking state (state S10 described below).

(c) For example, in the walking state, if the input IF 6 receives a fourth instruction to cause the arm mechanism 4 to stop the movement of the connector and to keep the connector stopped, the control unit 12 shifts the state of the robot system 1 from the walking state to a hold state (state S8 described below). In the hold state, if the input IF 6 receives cancellation of the fourth instruction and receives a fifth instruction to cause the walking mechanism 14 to apply one or more brakes to the wheels, the control unit 12 shifts the state of the robot system 1 from the hold state to the wait-2 state.

(d) For example, the control unit 12 controls whether or not to move the arm mechanism 4 and thereby controls whether or not to allow the arm mechanism 4 to perform motions. Also, the control unit 12 controls whether or not to apply brakes to the wheels and thereby controls whether or not to allow the walking mechanism 14 to perform motions.

(e) For example, an initial position is set to the arm mechanism 4. The initial position is a predetermined position where the arm mechanism 4 is coupled to the hold mechanism 3g. If the motion state management unit 21 obtains state information indicating a state where no brakes are applied to the wheels after the power of the robot 20 has been turned on, the control unit 12 performs control to prohibit the movement of the arm mechanism 4 to the initial position.

(f) For example, the arm mechanism 4 moves on a certain path to pull the care-receiver 7. If the motion state management unit 21 obtains state information indicating a state where no brakes are applied to the wheels, the control unit 12 performs control to prohibit the movement of the arm mechanism 4 on the certain path.

(g) For example, if the motion state management unit 21 obtains state information indicating a state where the robot 20 is moving in accordance with the motion of the walking mechanism 14, the control unit 12 performs control to prohibit the movement of the arm mechanism 4.

(h) For example, if an emergency stop instruction received by the emergency stop button 24 is cancelled, the control unit 12 performs control to move the arm mechanism 4 to the initial position only if the motion state management unit 21 obtains state information indicating a state where brakes are applied to the wheels.

(i) For example, only when an operation (specifically, pressing) is being performed on the input IF 6, the control unit 12 may control whether or not to allow the arm mechanism 4 and the walking mechanism 14 to perform a motion based on an instruction received by the input IF 6.

The determination of a motion state and the control of the robot system 1 will be described in detail with reference to FIGS. 9A to 9D, 10A to 10E, 11A to 11C, 12, 13, and 14A to 14E.

As illustrated in FIG. 12, the states of the robot system 1 include a power-off state (state S1 or first state), a wait-1 state (state S2-1 or second state), a wait-2 state (state S2-2 or third state), a moving-to-initial-position state (state S3), a pause-during-moving-to-initial-position state (state S4), a pause state (state S5 or fourth state), an "up" state (state S6), a "down" state (state S7), a hold state (state S8 or seventh state), and a walking state (state S10 or sixth state). The states S6 and S7 are also referred to as a fifth state.

These states will be described in detail below.

First, as illustrated in FIG. 9A, the care-receiver 7 sits on the seat 5, such as a bed located on the floor 13. Subsequently, with the arm mechanism 4 being folded for storage, a care-giver 18 moves the robot system 1 to the front of the care-receiver 7.

Figure 14A:
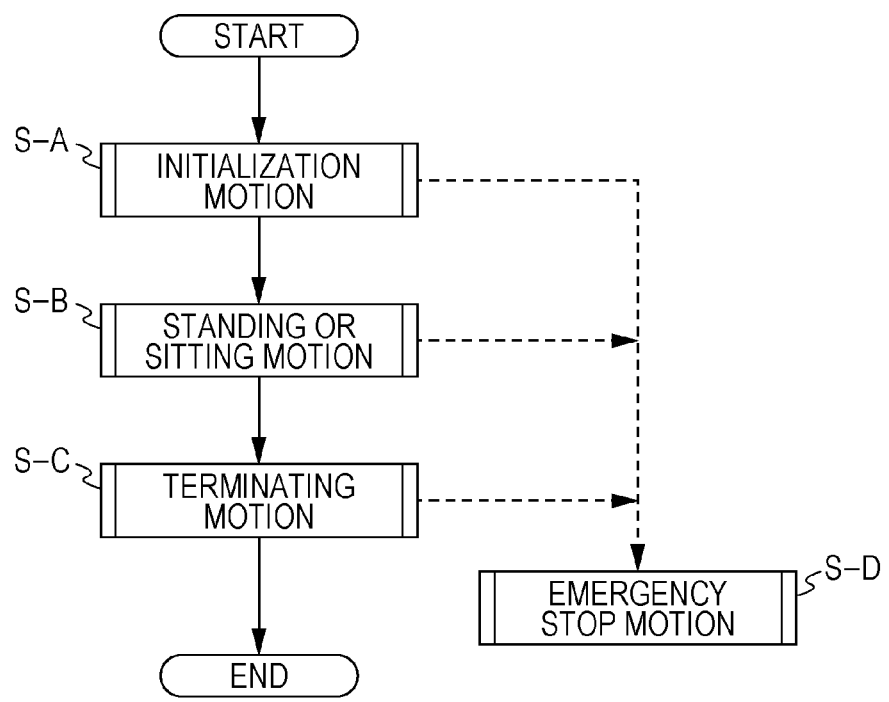
FIG. 14A is a flowchart illustrating an overall motion of the robot system according to the embodiment.

The overview of the process performed thereafter is illustrated in the flowchart in FIG. 14A. That is, an initialization motion S-A (see FIG. 14B), a standing or sitting motion S-B (see FIG. 14C), and a terminating motion S-C (see FIG. 14E) are performed in order. In addition to these motions, there is an emergency stop motion S-D (see FIG. 14D). The emergency stop motion S-D may be performed as an interruption process during any of the initialization motion S-A, the standing or sitting motion S-B, and the terminating motion S-C.

The initialization motion S-A (see FIG. 14B) is a motion in which pressing of the power button 6a of the input IF 6 shifts the state from the state S1 to the state S2, pressing of the move-to-initial-position button 6d shifts the state to the state S3, and the arm mechanism 4 moves from a folded and stored position to the initial position where the coupler 3c of the care belt 3 is coupled to the arm mechanism 4.

The terminating motion S-C (see FIG. 14E) is performed to terminate the use of the robot 20, in which the coupler 3c of the care belt 3 and the coupler 4g of the arm mechanism 4 are disconnected from each other and then the power is turned off.

State S1

First, as illustrated in FIG. 9A, the care-receiver 7 sits on the seat 5, such as a bed located on the floor 13. Subsequently, with the arm mechanism 4 being folded for storage, the care-giver 18 moves the robot system 1 to the front of the care-receiver 7 (the front of the body of the care-receiver 7).

This state is a power-off state, that is, the state S1. As shown in the row of the motion state database 23 in which the state ID is S1, the input IF reception information associated with the state S1 is (1, 0, 0, 0, 0, 0, 1). That is, the robot system 1 is in the state of receiving input to the power button 6a and the emergency stop button 24.

The control unit 12 is notified of the input reception information and thereby controls whether or not to receive input from the input IF 6. If the input reception information is "1", the control unit 12 receives input to the corresponding button. If the input reception information is "0", the control unit 12 does not receive input to the corresponding button. If input to a receivable button is performed, the robot system 1 shifts to a predetermined state corresponding to the button. If input to a non-receivable button is performed, the robot system 1 does not shift to another state and remains in the current state.

The indication information associated with the state S1 in the motion state database 23 is (0, 0, 0, 0, 0, 0, 0). Thus, the control unit 12 instructs the indication unit 22 to turn off all the lamps of the indication unit 22 illustrated in FIG. 5. In response to the instruction from the control unit 12, the indication unit 22 turns off the power-button lamp 22a, the move-to-initial-position-button lamp 22d, the up-button lamp 22b, the down-button lamp 22c, the brake ON lamp 22e, the brake OFF lamp 22f, and the emergency-stop-button lamp 22g, as illustrated in the state S1 in FIG. 13.

In the state S1, the indication information is (0, 0, 0, 0, 0, 0, 0) because no power can be supplied to the lamps of the indication unit 22. If a battery is mounted in the robot 20 or if the indication unit 22 is able to perform indication without using power, the indication information may be (1, 0, 0, 0, 0, 0, 1).

State S1→State S2-1 or S2-2

Figure 14B:
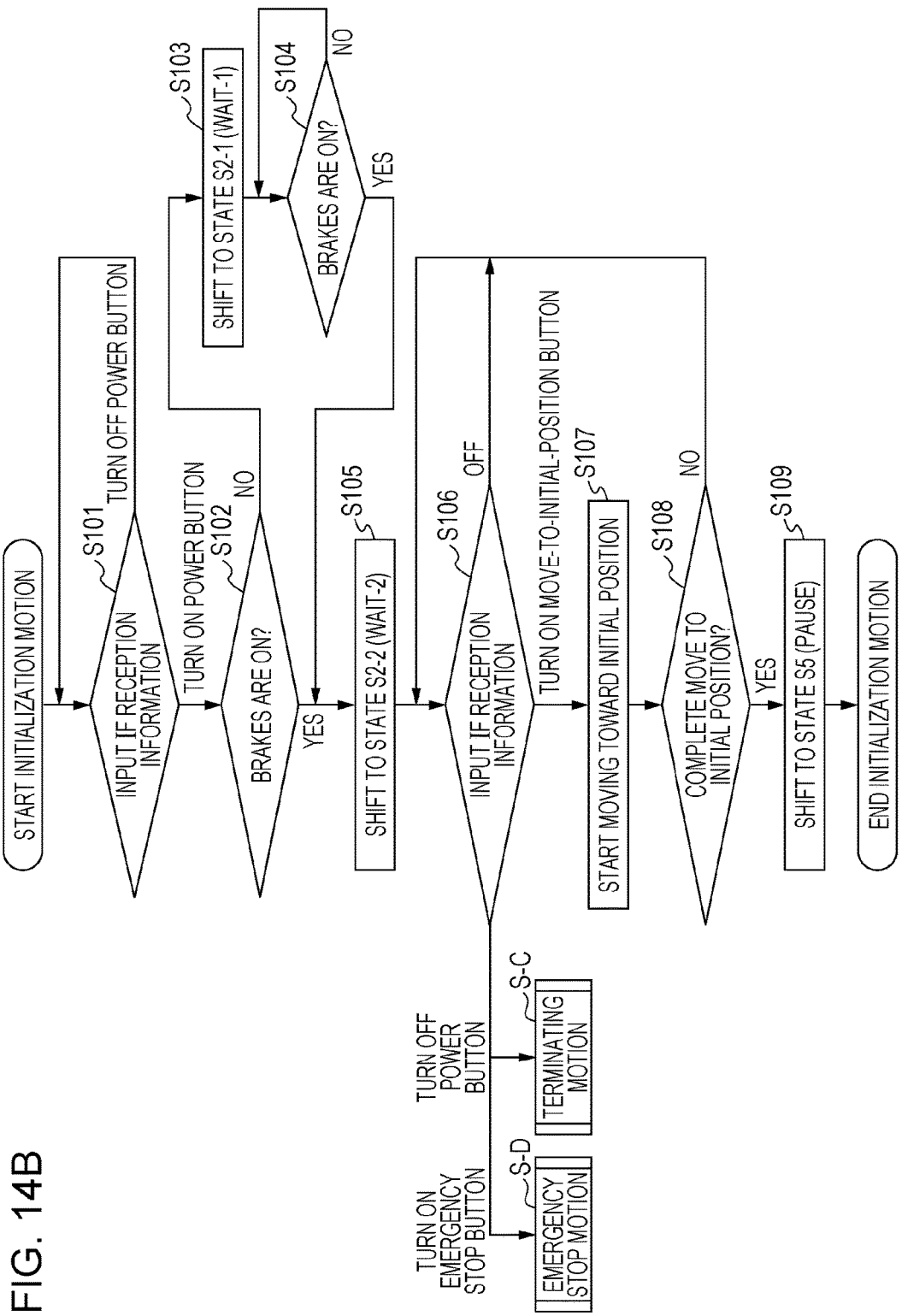
FIG. 14B is a flowchart illustrating an initialization motion of the robot system according to the embodiment.

Subsequently, as illustrated in FIGS. 9B and 14B, the care-giver 18 or the care-receiver 7 presses the power button 6a of the input IF 6 of the robot 20 (step S101).

Upon the power button 6a of the input IF 6 being pressed, the motion state management unit 21 receives, through the control unit 12, a notification indicating that the power button 6a has been pressed, and performs management to shift to the next state.

Specifically, if the power button 6a is pressed and if the brakes are in an OFF state, the robot system 1 shifts from the state S1 to the state S2-1 in FIG. 12 (step S103). In accordance with the shift, the robot system 1 stores "1" as the progress information about the state S2-1 in the motion state database 23 and "0" as the progress information about the other states, in the motion state database 23 through the database input/output unit 9. The input IF reception information associated with the state S2-1 in the motion state database 23 is (1, 0, 0, 0, 1, 0, 1). Thus, the control unit 12 is in the state of receiving input to the power button 6a, the brake ON button 6e, and the emergency stop button 24 and not receiving input to the move-to-initial-position button 6d, the up button 6b, the down button 6c, and the brake OFF button 6f. The control unit 12 controls whether or not to receive input from the input IF 6 on the basis of the input reception information.

Specifically, if the power button 6a, the brake ON button 6e, or the emergency stop button 24 is pressed, the control unit 12 receives the input and performs control predetermined for the pressed button. If the move-to-initial-position button 6d, the up button 6b, the down button 6c, or the brake OFF button 6f is pressed, the control unit 12 does not receive the input and does not perform control predetermined for the pressed button.

The indication information associated with the state S2-1 in the motion state database 23 is (1, 0, 0, 0, 1, 0, 1). The control unit 12 notifies the indication unit 22 of the motion state database 23 and thereby turns on the power-button lamp 22a, the brake ON lamp 22e, and the emergency-stop-button lamp 22g and turns off the move-to-initial-position-button lamp 22d, the up-button lamp 22b, the down-button lamp 22c, and the brake OFF lamp 22f as shown in the state S2-1 in FIG. 13. Accordingly, the care-giver 18 or the care-receiver 7 who operates the robot system 1 is able to visually determine which button receives input.

Here, if the brake ON button 6e is pressed, the control unit 12 performs control to activate (turn on) the front-wheel brakes 14c and the rear-wheel brakes 14d so that the front wheels 14a and the rear wheels 14b do not rotate. After the front-wheel brakes 14c and the rear-wheel brakes 14d have been activated, the robot system 1 shifts to the state S2-2 (steps S104 and S105). Use of the state S2-2 prevents the motion of the arm mechanism 4 in a state where the front-wheel brakes 14c and the rear-wheel brakes 14d are not activated. Thus, an accidental movement of the robot system 1 during the motion of the arm mechanism 4 can be prevented.

State S2-1→State S2-2 or State S1→State S2-2

In the state S1, if the power button 6a is pressed and if the brakes are in an ON state, the robot system 1 directly shifts from the state 1 to the state S2-2 without via the state S2-1 (step S105). In accordance with the shift to the state S2-2, the robot system 1 stores "1" as the progress information associated with the state S2-2 in the motion state database 23 and "0" as the progress information associated with the other states, in the motion state database 23 through the database input/output unit 9. The input IF reception information associated with the state S2-2 in the motion state database 23 is (1, 1, 0, 0, 0, 1, 1). The control unit 12 is in the state of receiving input to the power button 6a, the move-to-initial-position button 6d, the brake OFF button 6f, and the emergency stop button 24 and not receiving input to the up button 6b, the down button 6c, and the brake ON button 6e. The state of not receiving input includes a state where the control unit 12 receives input from the input IF 6 but the control unit 12 does not control the motion of the arm mechanism 4 on the basis of the received input. "Not control" may be interpreted as "the motion of the arm mechanism 4 is not changed before and after the reception of the input". On the basis of the input reception information, the control unit 12 controls whether or not to receive input from the input IF 6.

Specifically, if the power button 6a, the move-to-initial-position button 6d, the brake OFF button 6f, or the emergency stop button 24 is pressed, the control unit 12 receives the input and performs control predetermined for the pressed button. On the other hand, if the up button 6b, the down button 6c, or the brake ON button 6e is pressed, the control unit 12 does not receive the input and does not perform control predetermined for the pressed button (step S106).

The indication information associated with the state S2-2 in the motion state database 23 is (1, 1, 0, 0, 0, 1, 1). The control unit 12 notifies the indication unit 22 of the information in the motion state database 23 and thereby turns on the power-button lamp 22a, the move-to-initial-position-button lamp 22d, the brake OFF lamp 22f, and the emergency-stop-button lamp 22g, and turns off the up-button lamp 22b, the down-button lamp 22c, and the brake ON lamp 22e, as shown in the state S2-2 in FIG. 13. Accordingly, the care-receiver 7 is able to visually determine which button receives input.

If any one of the power button 6a, the move-to-initial-position button 6d, and the emergency stop button 24 is pressed and if the power button 6a is pressed to turn off the power when the control unit 12 performs control predetermined for the pressed button (step S106), the control unit 12 performs the terminating motion S-C.

If the emergency stop button 24 is pressed in step S106, the control unit 12 performs the emergency stop motion S-D.

State S3→State S4 or S5

Subsequently, referring to FIG. 9B, if the care-giver 18 or the care-receiver 7 presses the move-to-initial-position button 6d of the input IF 6 of the robot 20, the control unit 12 moves the robot system 1 to the initial position P0. As an example of the operation of the move-to-initial-position button 6d, the arm mechanism 4 moves only when the move-to-initial-position button 6d is kept pressed. When the move-to-initial-position button 6d is released, the arm mechanism 4 stops and moves to the initial position P0 illustrated in FIG. 7, that is, from the position illustrated in FIG. 9A to the position illustrated in FIG. 9B. The initial position P0 illustrated in FIG. 7 is the position when "1" is stored as the initial position flag in the motion information database 8.

Upon the move-to-initial-position button 6d being pressed, the robot system 1 shifts from the state S2-2 to the state S3, and the robot system 1 starts moving toward the initial position P0 (step S107). If the move-to-initial-position button 6d is turned off while the robot system 1 is moving toward the initial position P0, the robot system 1 shifts to the state S4 and stops. The control unit 12 controls and drives the first motor 41 and the second motor 42 independently of each other in order to drive the arm mechanism 4 so that the arm mechanism 4 moves to the initial position P0. Furthermore, if the move-to-initial-position button 6d is pressed, the arm mechanism 4 restarts moving toward the initial position P0 and the robot system 1 shifts from the state S4 to the state S3. After the arm mechanism 4 has reached the initial position P0, the robot system 1 shifts from the state S3 to the state S5 and stops (steps S108 and S109). In accordance with the shift, the robot system 1 stores "1" as the progress information about the shifted state in the motion state database 23 and "0" as progress information about the other states, in the motion state database 23 through the database input/output unit 9.

The input IF reception information associated with the state S3 in the motion state database 23 is (1, 1, 0, 0, 0, 0, 1). That is, the control unit 12 is in the state of receiving input to the power button 6a, the move-to-initial-position button 6d, and the emergency stop button 24, and not receiving input to the up button 6b, the down button 6c, the brake ON button 6e, and the brake OFF button 6f. The control unit 12 controls whether or not to receive input from the input IF 6 on the basis of the input reception information.

Specifically, if the power button 6a, the move-to-initial-position button 6d, or the emergency stop button 24 is pressed, the control unit 12 receives the input and performs control predetermined for the pressed button. If the up button 6b, the down button 6c, the brake ON button 6e, or the brake OFF button 6f is pressed, the control unit 12 does not receive the input and does not perform control predetermined for the pressed button.

The indication information associated with the state S3 in the motion state database 23 is (1, 1, 0, 0, 0, 0, 1). The control unit 12 notifies the indication unit 22 of the motion state database 23 and thereby turns on the power-button lamp 22a, the move-to-initial-position-button lamp 22d, and the emergency-stop-button lamp 22g, and turns off the up-button lamp 22b, the down-button lamp 22c, the brake ON lamp 22e, and the brake OFF lamp 22f, as shown in the state S3 in FIG. 13. Accordingly, in the robot system 1, the brakes are turned off when it is moving toward the initial position, and thereby an accidental movement of the robot system 1 can be prevented.

The input IF reception information associated with the state S4 in the motion state database 23 is (1, 1, 0, 0, 0, 1, 1). That is, the control unit 12 is in the state of receiving input to the power button 6a, the move-to-initial-position button 6d, the brake OFF button 6f, and the emergency stop button 24, and not receiving input to the up button 6b, the down button 6c, and the brake ON button 6e. The control unit 12 controls whether or not to receive input from the input IF 6 on the basis of the input reception information.

Specifically, if the power button 6a, the move-to-initial-position button 6d, the brake OFF button 6f, or the emergency stop button 24 is pressed, the control unit 12 receives the input and performs control predetermined for the pressed button. If the up button 6b, the down button 6c, or the brake ON button 6e is pressed, the control unit 12 does not receive the input and does not perform control predetermined for the pressed button.

The indication information associated with the state S4 in the motion state database 23 is (1, 1, 0, 0, 0, 1, 1). The control unit 12 notifies the indication unit 22 of the motion state database 23 and thereby turns on the power-button lamp 22a, the move-to-initial-position-button lamp 22d, the brake OFF lamp 22f, and the emergency-stop-button lamp 22g, and turns off the up-button lamp 22b, the down-button lamp 22c, and the brake ON lamp 22e, as shown in the state S4 in FIG. 13. Accordingly, in the robot system 1, the brakes can be turned off when it is not moving toward the initial position.

After the move to the initial position is completed, the state shifts from the state S3 to the state S5, and the motion of the arm mechanism 4 stops. Since the input IF reception information associated with the state S5 in the motion state database 23 is (1, 0, 1, 1, 0, 1, 1), the control unit 12 is in the state of receiving input to the power button 6a, the up button 6b, the down button 6c, the brake OFF button 6f, and the emergency stop button 24 and not receiving input to the move-to-initial-position button 6d and the brake ON button 6e.

Specifically, if the power button 6a, the up button 6b, the down button 6c, the brake OFF button 6f, or the emergency stop button 24 is pressed, the control unit 12 receives the input and performs control predetermined for the pressed button. If the move-to-initial-position button 6d or the brake ON button 6e is pressed, the control unit 12 does not receive the input and does not perform control predetermined for the pressed button.

The indication information associated with the state S5 in the motion state database 23 is (1, 0, 1, 1, 0, 1, 1). The control unit 12 notifies the indication unit 22 of the motion state database 23 and thereby turns on the power-button lamp 22a, the up-button lamp 22b, the down-button lamp 22c, the brake OFF lamp 22f, and the emergency-stop-button lamp 22g, and turns off the move-to-initial-position-button lamp 22d and the brake ON lamp 22e, as shown in the state S5 in FIG. 13. Accordingly, the care-giver 18 or the care-receiver 7 is able to visually determine which button receives input.

State S5→State S6 or S7, see FIG. 14C

As illustrated in FIGS. 9B and 14C, if the coupler 3c of the care belt 3 put on the care-receiver 7 and the coupler 4g of the arm mechanism 4 are at different heights, the height of the coupler 4g of the arm mechanism 4 is adjusted. In the example illustrated in FIG. 9B, the coupler 4g of the arm mechanism 4 needs to be moved upward so as to locate the coupler 3c and the coupler 4g at the same height, and thus height adjustment is performed by pressing the up button 6b of the input IF 6 (steps S211, S212, and S213).

The height adjustment is performed in accordance with, for example, the motion information database 8 in FIG. 6 (the path is illustrated in FIG. 7). For example, if the up button 6b is pressed at time t1 when the progress information is "1", the control unit 12 performs control so that the arm mechanism 4 moves the coupler 4g in the upward direction on the path illustrated in FIG. 7, that is, in the direction of time t2 in FIG. 7 (downward in the table in FIG. 6). If the down button 6c is pressed, the control unit 12 performs control so that the coupler 4g is moved in the downward direction on the path illustrated in FIG. 7, that is, in the direction of time t0 in FIG. 7 (upward in the table in FIG. 6).

In the example illustrated in FIG. 9B, the coupler 4g of the arm mechanism 4 needs to be moved upward, and thus the control unit 12 controls and drives the first motor 41 and the second motor 42 independently of each other so that the arm mechanism 4 is driven upward along the path illustrated in FIG. 7 in accordance with pressing of the up button 6b of the input IF 6. Upon the up button 6b being released when the height adjustment is completed, the arm mechanism 4 stops at the position. If the up button 6b is pressed in the state S5, the robot system 1 shifts to the state S6 (step S213). After that, if the up button 6b is released, the robot system 1 shifts to the state S5 (steps S215 and S216). If the down button 6c is pressed in the state S5, the robot system 1 shifts to the state S7 (step S212). If the down button 6c is released thereafter, the robot system 1 shifts to the state S5 (steps S214 and S216).

In accordance with the shift, the robot system 1 stores "1" as the progress information about the shifted state in the motion state database 23 and "0" as the progress information about the other states, in the motion state database 23 through the database input/output unit 9. If the robot system 1 shifts to the state S6 or S7, the input IF reception information in the motion state database 23 is (1, 0, 1, 1, 0, 0, 1). The control unit 12 is in the state of receiving input to the power button 6a, the up button 6b, the down button 6c, and the emergency stop button 24 and not receiving input to the move-to-initial-position button 6d, the brake ON button 6e, and the brake OFF button 6f.

Specifically, if the power button 6a, the up button 6b, the down button 6c, or the emergency stop button 24 is pressed, the control unit 12 receives the input and performs control predetermined for the pressed button. If the move-to-initial-position button 6d, the brake ON button 6e, or the brake OFF button 6f is pressed, the control unit 12 does not receive the input and does not perform control predetermined for the pressed button. That is, since input to the brake ON button 6e or the brake OFF button 6f is not received, the motion of the arm mechanism 4 of the robot system 1 in a state where the front-wheel brakes 14c and the rear-wheel brakes 14d are not applied can be prevented, and also an accidental movement of the robot system 1 during the movement of the arm mechanism 4 can be prevented.

The indication information associated with the state S6 or S7 in the motion state database 23 is (1, 0, 1, 1, 0, 0, 1). The control unit 12 notifies the indication unit 22 of the motion state database 23 and thereby turns on the power-button lamp 22a, the up-button lamp 22b, the down-button lamp 22c, and the emergency-stop-button lamp 22g, and turns off the move-to-initial-position-button lamp 22d, the brake ON lamp 22e, and the brake OFF lamp 22f as shown in the state S6 or S7 in FIG. 13. Accordingly, it becomes possible to visually determine which button receives input. The robot system 1 stops control upon the up button 6b or the down button 6c being released, corrects the progress information "1" in the motion information database 8 to "0" and corrects the progress information about the stop time to "1". FIG. 9B illustrates the robot system 1 before adjustment is performed (the initial position P0 in FIG. 7) and FIG. 9C illustrates the robot system 1 after adjustment is performed (the position P1 in FIG. 7).

Figure 9C:
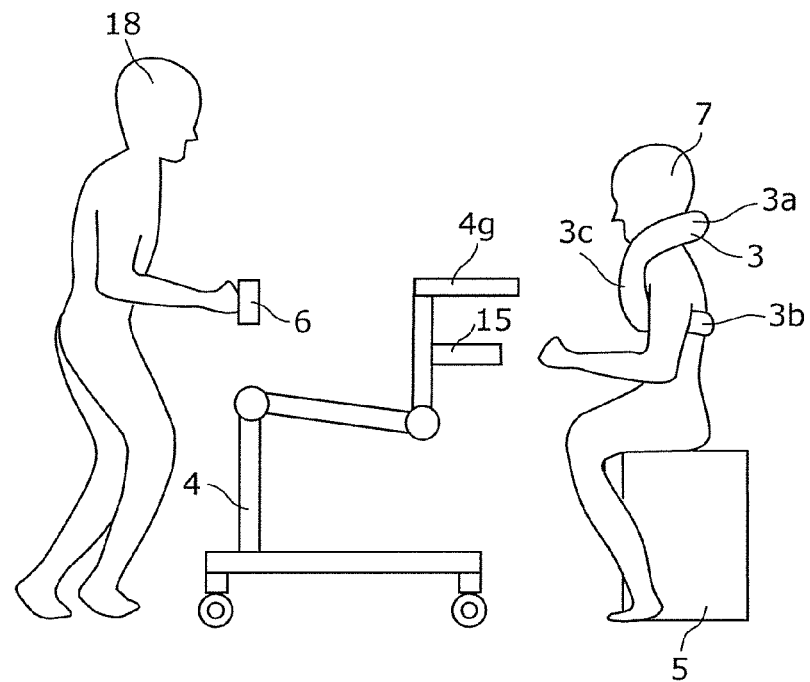
FIG. 9C is an explanatory diagram illustrating a motion of the robot system according to the embodiment.
Figure 9D:
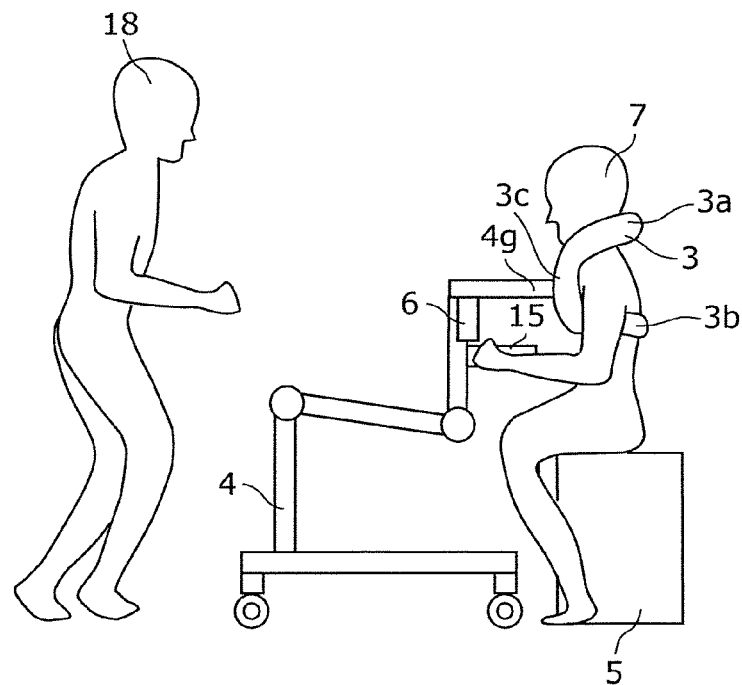
FIG. 9D is an explanatory diagram illustrating a motion of the robot system according to the embodiment.

With the above-described height adjustment, the heights of the coupler 3c of the care belt 3 and the coupler 4g of the arm mechanism 4 can be adjusted as illustrated in FIG. 9C. Subsequently, the coupler 3c of the care belt 3 and the coupler 4g of the arm mechanism 4 are coupled to each other as illustrated in FIG. 9D.

Figure 10A:
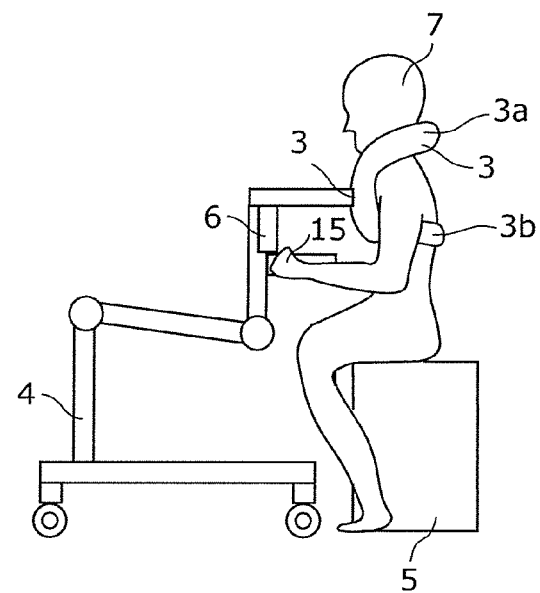
FIG. 10A is a first explanatory diagram illustrating a standing motion performed by the care-receiver using the robot system according to the embodiment.
Figure 10B:
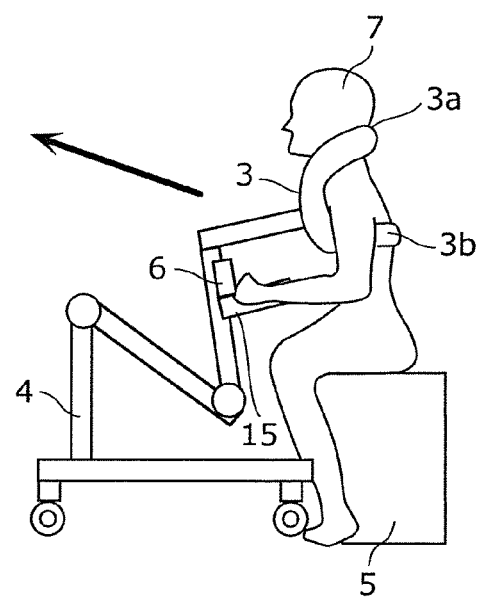
FIG. 10B is a second explanatory diagram illustrating the standing motion performed by the care-receiver using the robot system according to the embodiment.
Figure 10C:
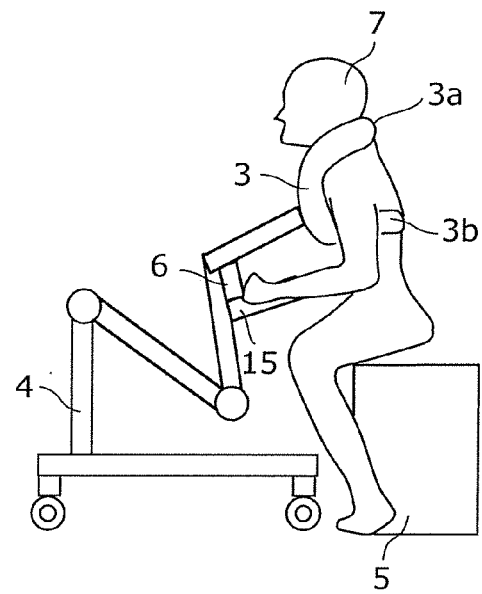
FIG. 10C is a third explanatory diagram illustrating the standing motion performed by the care-receiver using the robot system according to the embodiment.
Figure 10D:
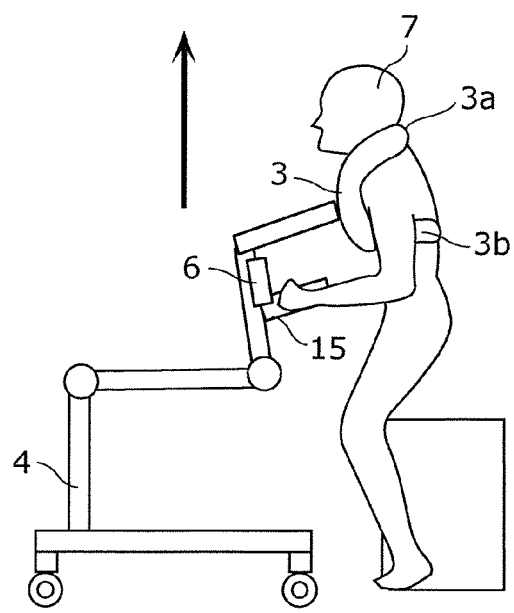
FIG. 10D is a fourth explanatory diagram illustrating the standing motion performed by the care-receiver using the robot system according to the embodiment.

Subsequently, as illustrated in FIG. 10A, the care-receiver 7 starts a standing motion from the sitting position on the seat 5. Upon the up button 6b of the input IF 6 being pressed, the control device 11 starts controlling the arm mechanism 4, and the care-receiver 7 stands up along the path in FIG. 7 as illustrated in FIGS. 10B to 10D. When the care-receiver 7 reaches a standing completion position (standing position) and the up button 6b is released, the arm mechanism 4 stops at the position. The control unit 12 corrects the progress information "1" in the motion information database 8 to "0" and then corrects the progress information about the stopped time to "1". When the care-receiver 7 is in the standing position, the state can be shifted from the state S5 to the state S6 by using the up button 6b, as in the case of the above-described height adjustment. The method for shift is the same as the above-described method for the height adjustment, and thus the description thereof is omitted.

State S5→State S10

Figure 10E:
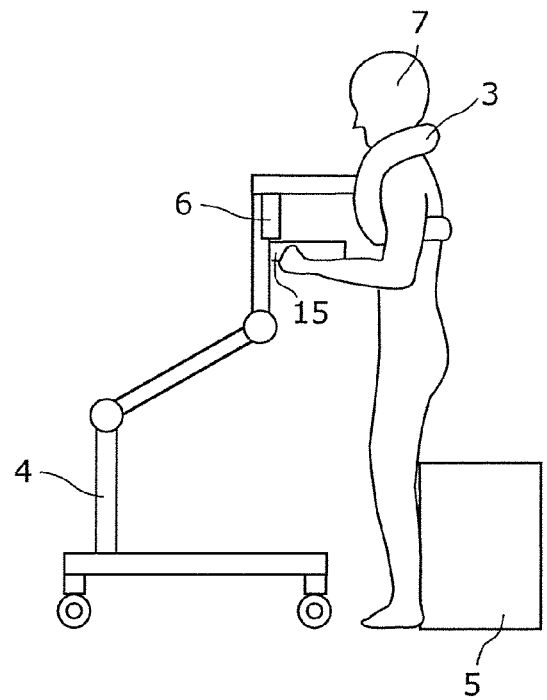
FIG. 10E is a fifth explanatory diagram illustrating the standing motion performed by the care-receiver using the robot system according to the embodiment.

Subsequently, when the care-receiver 7 completes a standing motion from the seat 5 and when the brake OFF button 6f is pressed (the brakes are turned off) in the state illustrated in FIG. 10E (state S5), the front-wheel brakes 14c and the rear-wheel brakes 14d are released (shift to state S10). When the care-receiver 7 applies a force in the forward direction (leftward direction in FIG. 10E), the wheels of the walking mechanism 14 rotate and assist the care-receiver 7 in walking as a walker. The input IF reception information associated with the state S10 in the motion state database 23 is (1, 0, 0, 0, 1, 0, 1). That is, the control unit 12 is in the state of receiving input to the power button 6a, the brake ON button 6e, and the emergency stop button 24 and not receiving input to the move-to-initial-position button 6d, the up button 6b, the down button 6c, and the brake OFF button 6f. The indication information associated with the state S10 in the motion state database 23 is (1, 0, 0, 0, 1, 0, 1). The control unit 12 notifies the indication unit 22 of the motion state database 23 and thereby turns on the power-button lamp 22a, the brake ON lamp 22e, and the emergency-stop-button lamp 22g and turns off the move-to-initial-position-button lamp 22d, the up-button lamp 22b, the down-button lamp 22c, and the brake OFF lamp 22f as shown in the state S10 in FIG. 13. Accordingly, in the robot system 1, an accidental movement of the arm mechanism 4 during walking can be prevented.

In this example, pressing of the brake OFF button 6f causes the robot system 1 to shift to the state S10. Alternatively, shift to the state S10 may be inhibited if the arm mechanism 4 is not at a certain height or more. Accordingly, shift to a walking state when the care-receiver 7 is not in a standing position can be prevented. Furthermore, a force sensor that detects the force applied to the arm mechanism 4 by the care-receiver 7 may be provided at an upper portion of the arm mechanism 4, and the state may shift to the state S10 if the value of the force sensor is smaller than a certain value. Accordingly, when the care-receiver 7 is leaning against the arm mechanism 4, it is determined that it is difficult for the care-receiver 7 to walk and the robot system 1 shifts to a walking state. Accordingly, a more safety robot system 1 can be provided.

State S10→State S5→State S6 or S7

The robot system 1 assists the care-receiver 7 in performing a sitting motion for sitting on the seat 5 in a toilet, for example.

Figure 11A:
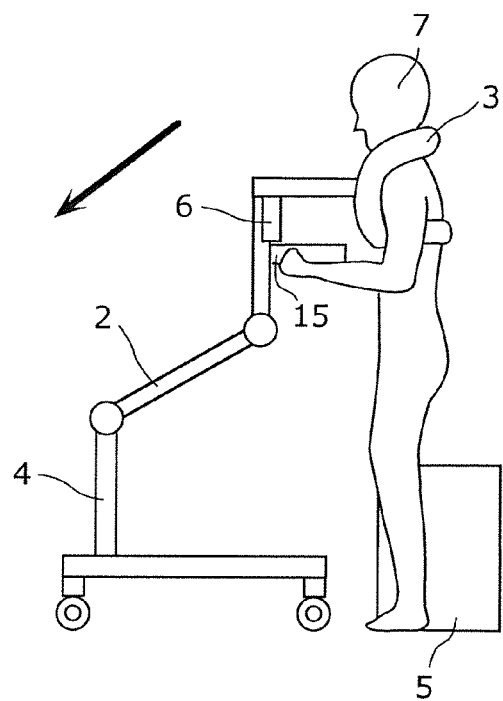
FIG. 11A is a first explanatory diagram illustrating a sitting motion performed by the care-receiver using the robot system according to the embodiment.

As illustrated in FIG. 11A, the care-receiver 7 starts a sitting motion from a standing position in front of the seat 5. First, when the brake ON button 6e of the input IF 6 is pressed, the control unit 12 performs control to activate the front-wheel brakes 14c and the rear-wheel brakes 14d (turn on the brakes) so that the front wheels 14a and the rear wheels 14b do not rotate. Then the robot system 1 shifts from the state S10 to the state S5.

Subsequently, when the down button 6c is pressed, assistance for sitting starts. When the down button 6c is released, the motion stops at the position. At this time, if the arm mechanism 4 moves with momentum, the buttocks of the care-receiver 7 may collide with the seat 5, which may break the buttock bone. To prevent such an accident, the robot system 1 assists the care-receiver 7 in moving to a sitting position without falling down. Furthermore, to allow the care-receiver 7 to adjust the sitting position on the seat 5, the robot system 1 is able to stop upon release of the down button 6c of the input IF 6.

Specifically, as illustrated in FIG. 11A, with the down button 6c of the input IF 6 being pressed, the robot system 1 controls the motion in the upward direction of the table in FIG. 6 sequentially from the position at the time when the progress information in the motion information database 8 is "1".

Figure 11B:
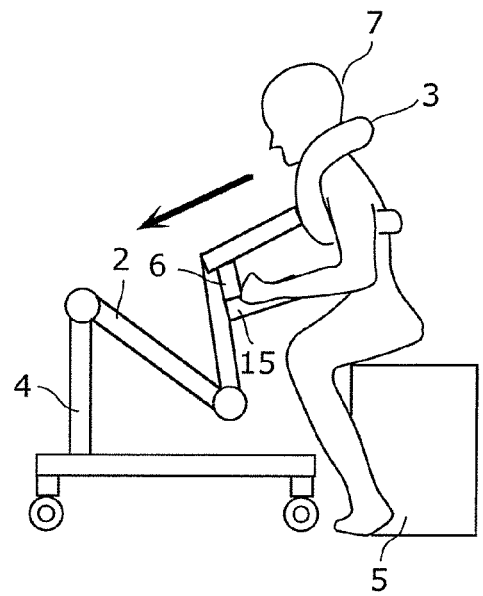
FIG. 11B is a second explanatory diagram illustrating the sitting motion performed by the care-receiver using the robot system according to the embodiment.
Figure 11C:
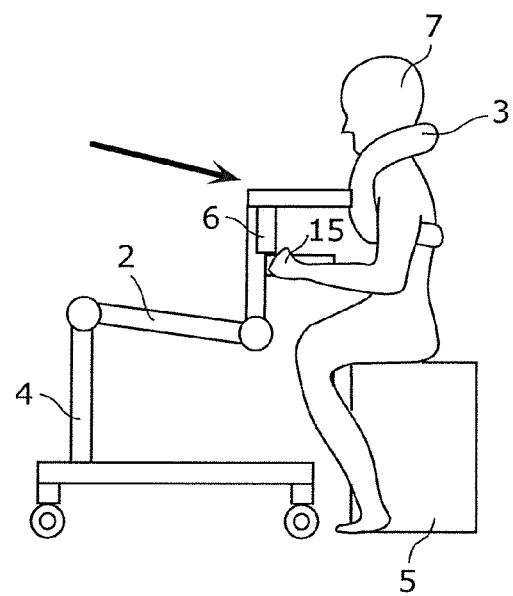
FIG. 11C is a third explanatory diagram illustrating the sitting motion performed by the care-receiver using the robot system according to the embodiment.

For example, the robot system 1 generates a motion in the downward direction from the standing position P2 in FIG. 7 and thereby controls the motion to follow the path illustrated in FIG. 7. A motion in a forward and downward direction is performed as illustrated in FIGS. 11A and 11B, and the down button 6c of the input IF 6 is released when the motion of sitting on the seat 5 is completed as illustrated in FIG. 11C. In the robot system 1, the control unit 12 corrects the progress information at the time of stop to "1", as in the case of a standing motion.

The up button 6b or the down button 6c of the input IF 6 can be pressed or released regardless of the position of the arm mechanism 4. For example, when the care-receiver 7 is going to sit on a toilet seat, he/she starts a sitting motion from the state illustrated in FIG. 11A, and releases the down button 6c of the input IF 6 to stop the motion at the time illustrated in FIG. 11B. The care-receiver 7 takes off his/her underwear or the like with the buttocks not touching the toilet seat, and then presses the down button 6c again. Accordingly, the care-receiver 7 is able to sit on the seat 5, such as a toilet seat. At the time of a standing motion, if the care-receiver 7 wants to adjust the height after stopping the standing motion at a standing position, he/she is able to adjust the height by pressing the up button 6b or the down button 6c.

At the time of performing a sitting motion, as in the case of adjusting the height, the robot system 1 is able to shift from the state S5 to the state S6 or S7 by using the down button 6c or the up button 6b. The method for shifting is similar to the method for the above-described height adjustment, and thus the description thereof is omitted.

Figure 14D:
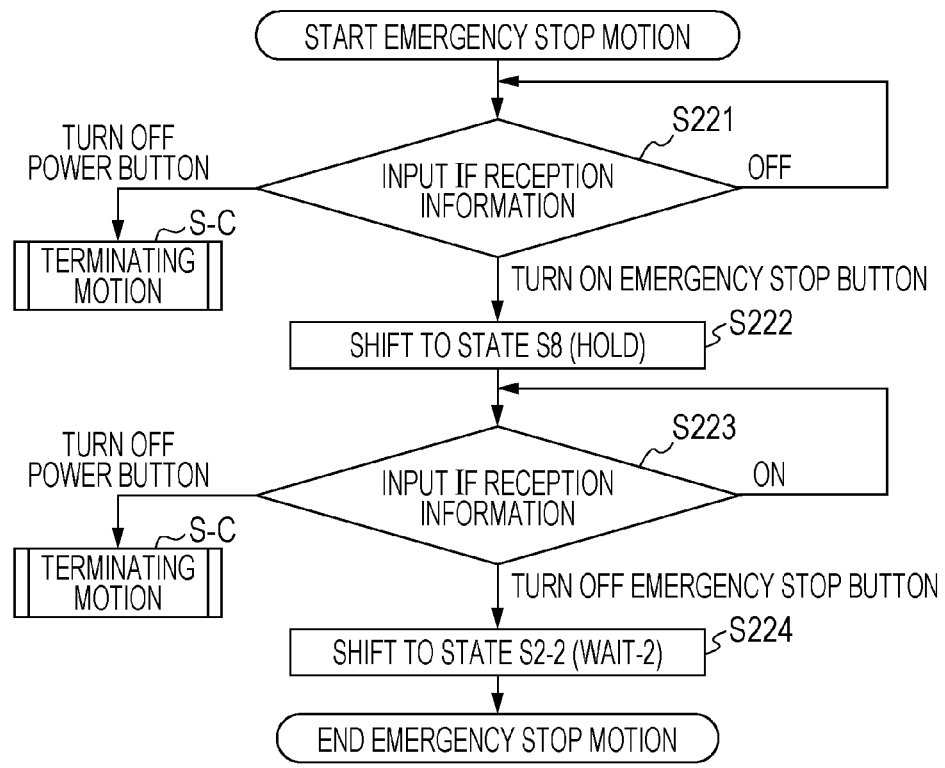
FIG. 14D is a flowchart illustrating an emergency stop motion of the robot system according to the embodiment.

Emergency Stop Button (S92 (All the States Other than S8)→S8), See FIG. 14D

For example, the emergency stop button 24 can be pressed in any state because the value for the emergency stop button 24 in the input IF reception information is "1" in all the states in the motion state database 23. When the emergency stop button 24 is pressed (step S221), the robot system 1 shifts from any one of all the states S1 to S7 other than the state S8 to the state S8 (step S222). Here, the state S8 is a hold state where the state (for example, the position) of the arm mechanism 4 is held when the state shifts from any one of the states S1 to S7 to the state S8. In the state S8, when the power of the robot 20 is in an ON state, the arm mechanism 4 stops at the position in the robot system 1. ON or OFF of the wheel brakes at the time when the emergency stop button 24 is pressed is held.

In the state S8, the input IF reception information in the motion state database 23 is (1, 0, 0, 0, ?, ?, 1). Here, "?" takes a value of 0 or 1 in accordance with the state of the brakes when the emergency stop button 24 is pressed. That is, if the brakes are in an ON state when the emergency stop button 24 is pressed, the input IF reception information is (1, 0, 0, 0, 0, 1, 1). If the brakes are in an OFF state when the emergency stop button 24 is pressed, the input IF reception information is (1, 0, 0, 0, 1, 0, 1).

If the input IF reception information is (1, 0, 0, 0, 0, 1, 1), the control unit 12 receives input to the power button 6a, the brake OFF button 6f, and the emergency stop button 24 and does not receive input to the other buttons. If the input IF reception information is (1, 0, 0, 0, 1, 0, 1), the control unit 12 receives input to the power button 6a, the brake ON button 6e, and the emergency stop button 24 and does not receive input to the other buttons. On the basis of the input IF reception information, the control unit 12 controls whether or not to receive input from the input IF 6 (step S223).

Furthermore, it is assumed that the indication information is (1, 0, 0, 0, 0, 1, 1) when the input IF reception information in the state S8 is (1, 0, 0, 0, 0, 1, 1) and that the indication information is (1, 0, 0, 0, 1, 0, 1) when the input IF reception information in the state S8 is (1, 0, 0, 0, 1, 0, 1).

If the indication information is (1, 0, 0, 0, 0, 1, 1), the control unit 12 notifies the indication unit 22 so that the power-button lamp 22a, the brake OFF lamp 22f, and the emergency-stop-button lamp 22g are turned on and the other lamps are turned off. If the indication information is (1, 0, 0, 0, 1, 0, 1), the control unit 12 notifies the indication unit 22 so that the power-button lamp 22a, the brake ON lamp 22e, and the emergency-stop-button lamp 22g are turned on and the other lamps are turned off. When the emergency stop button 24 is turned off, the robot system 1 shifts to the state S2-1 if the brakes are in an OFF state and shifts to the state S2-2 if the brakes are in an ON state (step S224).

After the shift to the state S2-1 or the state S2-2, assist for a standing or sitting motion can be performed again by moving to the initial position by using the move-to-initial-position button 6d as described above.

Figure 14E:
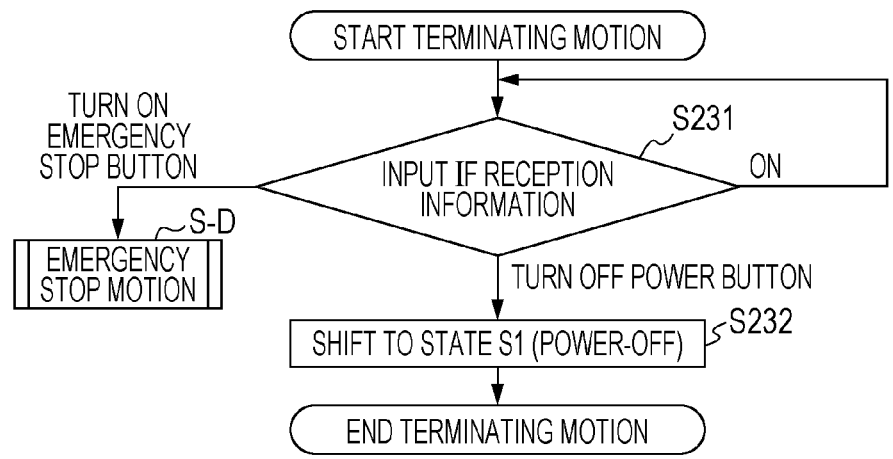
FIG. 14E is a flowchart illustrating a terminating motion of the robot system according to the embodiment.

Turn Off Power Button (State S91 (All the States Other than S1)→State S1), See FIG. 14E For example, the power button 6a can be pressed in any state because the value for the power button 6a in the input IF reception information is "1" in all the states in the motion state database 23 (step S231). When the power button 6a is pressed, power supply stops, and the robot system 1 shifts to the state S1 where the arm mechanism 4 is folded as illustrated in FIGS. 9A and 14E (step S232). The control in the state S1 is similar to the above-described control in the state S1 and thus the description thereof is omitted.

Brake OFF in State S4 or S8→State S2-1

When the brake OFF button 6f is pressed in state S4 or S8, the robot system 1 shifts to the state S2-1. The control in the state S2-1 is similar to the above-described control in the state S2-1 and thus the description thereof is omitted.

Advantages of the Embodiment

In the robot according to the embodiment, the state of the system is managed in accordance with the ON or OFF state of the brakes for the wheels and the operation that is performed when the care-receiver performs a standing or sitting motion, and accordingly the performance of a motion unintended by an operator can be suppressed. Furthermore, whether or not each button of the operation interface receives input is indicated to the operator in accordance with a state. Accordingly, the operation interface of the robot can be easily understood by the care-receiver or care-giver.

Modification Example of the Embodiment

In the above-described embodiment, the arm mechanism 4 is attached to the walking mechanism 14 of the robot system 1. Alternatively, the arm mechanism 4 may be attached to the seat 5, for example, a bedside, toilet, wheelchair, or the like.

The arm mechanism 4 is used as an example of the traction mechanism, but the traction mechanism is not limited thereto. Any mechanism may be used as the traction mechanism as long as the mechanism applies an external force to the care belt 3 to assist the care-receiver 7 in performing a standing motion.

In the above-described embodiment, the arm mechanism 4 is moved to the initial position before assisting the care-receiver 7 in performing a standing or sitting motion. Alternatively, the movement to the initial position may be omitted. In the case of omitting the movement to the initial position, the state may shift to the state S3 in which the arm mechanism 4 is stopped at the initial position, not to the state S1 in which the arm mechanism 4 is folded, when the power is turned off.

In the above-described embodiment, a part of the control device 11 can be configured by software. Thus, for example, the part may be stored as a computer program including steps of the control operation according to the above-described embodiment in a recording medium such as a storage device (hard disk or the like) in a readable manner, and the computer program may be loaded to a temporary storage device (semiconductor memory) of a computer and executed by using a central processing unit (CPU). Accordingly, the above-described individual steps can be executed.

More specifically, the above-described control device 11 is a computer system constituted by a microprocessor, a read only memory (ROM), a random access memory (RAM), a hard disk unit, a display unit, a keyboard, and a mouse. The RAM or the hard disk unit stores a computer program. The microprocessor operates in accordance with the computer program, and thereby each unit implements its function. Here, the computer program is constituted by combining a plurality of instruction codes describing instructions to the computer in order to implement a certain function.

For example, a program execution unit such as a CPU reads and executes a software program recorded on a recording medium such as a hard disk or a semiconductor memory, and thereby each component can be implemented. The software that implements some or all of the components constituting the control device according to the above-described embodiment is the following program.

That is, the program causes a computer to execute a method for controlling a robot, including: receiving an instruction to operate at least one of a tractor and a walker, the tractor including a connector and pulling a user through the connector, the walker being coupled to the tractor, and the walker including wheels for moving the tractor and one or more brakes for the wheels; and in response to reception of the instruction, determining whether or not the robot permits the tractor and/or the walker to perform a process based on the instruction, in accordance with a current state of the robot, the current state being one of a plurality of states of the robot. Each of the plurality of states of the robot is represented by using values of a plurality of items, one of the plurality of items being an item indicating whether or not the one or more brakes are applied to the wheels.

The computer that executes the program may be a single computer or a plurality of computers. That is, centralized processing may be performed or distributed processing may be performed. The various aspects described in this specification may be combined together as long as contradiction does not occur.

The robot according to an embodiment of the present disclosure is applicable as a motion assist system for assisting a care-receiver in performing a standing, walking, or sitting motion.

What is claimed is:

1. A robot comprising:
a tractor that includes a connector and that pulls a user through the connector;
a walker that includes wheels for moving the tractor, the walker also including one or more brakes for the wheels, and the walker being coupled to the tractor;
an input device that receives an instruction to operate at least one of the tractor and the walker; and
a controller that, in response to reception of the instruction by the input device, determines whether or not to permit the tractor and/or the walker to perform a process based on the instruction, in accordance with a current state of the robot, the current state being one of a plurality of states of the robot,
wherein each of the plurality of states of the robot is represented by using values of a plurality of items, one of the plurality of items being an item indicating whether or not the one or more brakes are applied to the wheels.

2. The robot according to claim 1, wherein
the plurality of states include a first state in which power is not supplied to the robot,
in the first state, if the one or more brakes are not applied to the wheels and if the power is supplied to the robot, the first state shifts to a second state included in the plurality of states,
in the first state, if the one or more brakes are applied to the wheels and if the power is supplied to the robot, the first state shifts to a third state included in the plurality of states,
in the second state, if the input device receives a first instruction to cause the tractor to locate the connector at a predetermined position where the connector is coupled to a hold mechanism that holds a body of the user, the controller does not permit the tractor to locate the connector at the predetermined position, and
while the input device is receiving the first instruction in the third state, the controller permits the tractor to locate the connector at the predetermined position.

3. The robot according to claim 2, wherein
if the input device receives the first instruction in the third state and if the tractor locates the connector at the predetermined position, the third state shifts to a fourth state,
in the fourth state, while the input device is receiving a second instruction to cause the tractor to move the connector on a certain path, the controller permits the tractor to move the connector on the certain path and does not permit the walker to release the one or more brakes,
in the fourth state, if the input device receives the second instruction, the fourth state shifts to a fifth state, and in the fourth state, if the input device receives a third instruction to cause the walker to release the one or more brakes, the controller permits the walker to release the one or more brakes and does not permit the tractor to move the connector on the certain path, and the fourth state shifts to a sixth state.

4. The robot according to claim 3, wherein if the input device receives, in the sixth state, a fourth instruction to cause the tractor to stop movement of the connector and to keep the connector stopped, the sixth state shifts to a seventh state, and in the seventh state, if the input device receives cancellation of the fourth instruction and also receives a fifth instruction to cause the walker to apply the one or more brakes to the wheels, the seventh state shifts to the third state.

5. The robot according to claim 4, further comprising:

an indicator that, in response to reception of the fifth instruction by the input device, indicates whether or not the controller permits the walker to apply the one or more brakes to the wheels.

6. A method for controlling a robot, comprising:

receiving an instruction to operate at least one of a tractor and a walker, the tractor including a connector and pulling a user through the connector, the walker being coupled to the tractor, the walker including wheels for moving the tractor, and the walker including one or more brakes for the wheels; and in response to reception of the instruction, determining whether or not the robot permits the tractor and/or the walker to perform a process based on the instruction, in accordance with a current state of the robot, the current state being one of a plurality of states of the robot, wherein each of the plurality of states of the robot is represented by using values of a plurality of items, one of the plurality of items being an item indicating whether or not the one or more brakes are applied to the wheels.

7. A non-transitory computer-readable recording medium storing a control program for causing a device including a processor to execute a process, the process comprising:

receiving an instruction to operate at least one of a tractor and a walker, the tractor including a connector and pulling a user through the connector, the walker being coupled to the tractor, the walker including wheels for moving the tractor, and the walker including one or more brakes for the wheels; and in response to reception of the instruction, determining whether or not the robot permits the tractor and/or the walker to perform a process based on the instruction, in accordance with a current state of the robot, the current state being one of a plurality of states of the robot, wherein each of the plurality of states of the robot is represented by using values of a plurality of items, one of the plurality of items being an item indicating whether or not the one or more brakes are applied to the wheels.

8. A robot comprising:

an input device that receives an instruction;

a controller that determines a current state of the robot and whether or not to cause an operation based on the received instruction and the current state;

a tractor that includes a connector, the tractor pulling a user through the connector; and a walker that is coupled to the tractor, the walker including wheels for moving the tractor, and the walker including one or more brakes for the wheels, wherein the controller determines the current state is a first state when power to the robot is turned on without the one or more brakes being applied to the wheels, the first state remaining if the controller receives no instruction during the first state, wherein the controller determines the current state is a second state when the power to the robot is turned on with the one or more brakes being applied to the wheels, the second state remaining if the controller receives no instruction during the second state, wherein, when the current state is the first state and the received instruction is an instruction to apply the one or more brakes to the wheels, the controller causes the walker to apply the one or more brakes to the wheels and determines the current state is the second state, wherein, when the current state is the second state and the received instruction is a first instruction to cause the tractor to move the connector to a predetermined position where the connector is coupled to a hold mechanism that supports the user, the controller causes the tractor to move the connector to the predetermined position and determines the current state is a third state, and wherein, when the current state is the first state and the received instruction is the first instruction, the controller does not cause the tractor to move the connector to the predetermined position without changing the current state.

* * * * *